US011763238B2

United States Patent
Murao et al.

(10) Patent No.: US 11,763,238 B2
(45) Date of Patent: Sep. 19, 2023

(54) USER INTERFACE-BASED MOBILITY TRANSACTION MANAGEMENT ON A MAAS PLATFORM

(71) Applicant: SONY CORPORATION, Tokyo (JP)

(72) Inventors: Sadayoshi Murao, Bangalore (IN); Madhvesh Sulibhavi, Bangalore (IN); Srinivasa Pingili, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 276 days.

(21) Appl. No.: 16/987,890

(22) Filed: Aug. 7, 2020

(65) Prior Publication Data

US 2022/0044180 A1  Feb. 10, 2022

(51) Int. Cl.
  *G06Q 30/00* (2023.01)
  *G06Q 10/0637* (2023.01)
  (Continued)

(52) U.S. Cl.
  CPC ..... *G06Q 10/06375* (2013.01); *G06F 11/006* (2013.01); *G06F 16/27* (2019.01);
  (Continued)

(58) Field of Classification Search
  CPC .......... G06Q 10/06375; G06Q 20/045; G06Q 50/30; G06Q 20/202; G06Q 30/0185;
  (Continued)

(56) References Cited

U.S. PATENT DOCUMENTS

| 2003/0095555 A1* | 5/2003 | McNamara | H04L 51/48 370/401 |
| 2014/0222594 A1* | 8/2014 | Rose | G06Q 20/385 705/16 |

(Continued)

FOREIGN PATENT DOCUMENTS

| CN | 106657397 A | 5/2017 |
| WO | 2020/120672 A1 | 6/2020 |

(Continued)

OTHER PUBLICATIONS

Ramachandran et al: "Trinity: A Distributed Publish/Subscribe Broker with Blockchain-based Immutability", https://ieeexplore.ieee.org/document/8751388, 2019 IEEE International Conference on Blockchain and Cryptocurrency (ICBC)* (Year: 2019).*

(Continued)

Primary Examiner — Patricia H Munson
Assistant Examiner — Uche Byrd
(74) Attorney, Agent, or Firm — CHIP LAW GROUP

(57) ABSTRACT

A system including broker node device is provided. The broker node device collects operation information associated with first plurality of nodes of first MaaS network. The broker node device determines operational trouble associated with the first plurality of nodes, based on the operation information and receives, from first publisher node of the first plurality of nodes, first transaction message associated with first transaction of first transportation service of the first MaaS network. The first transaction message includes first correlation identifier generated by first publisher node. The (Continued)

broker node device receives, from second node of the first plurality of nodes, first notification associated with receipt of first transaction message at second node. The broker node device determines cause for failure of first transaction based on the first correlation identifier, the first notification, or the operational trouble, and further controls display device to display the cause for failure.

17 Claims, 15 Drawing Sheets

(51) Int. Cl.

| | | |
|---|---|---|
| *G06F 16/27* | (2019.01) | |
| *G06N 20/00* | (2019.01) | |
| *G06F 11/00* | (2006.01) | |
| *G06N 5/04* | (2023.01) | |
| *G06Q 20/04* | (2012.01) | |
| *G06Q 50/30* | (2012.01) | |
| *H04L 9/40* | (2022.01) | |
| *H04L 67/12* | (2022.01) | |
| *G06Q 20/20* | (2012.01) | |
| *G06Q 30/018* | (2023.01) | |

(52) U.S. Cl.
CPC ............... *G06N 5/04* (2013.01); *G06N 20/00* (2019.01); *G06Q 20/045* (2013.01); *G06Q 50/30* (2013.01); *H04L 63/0876* (2013.01); *H04L 63/102* (2013.01); *H04L 67/12* (2013.01); *G06F 2201/87* (2013.01); *G06Q 20/202* (2013.01); *G06Q 30/0185* (2013.01)

(58) Field of Classification Search
CPC .... G06F 16/27; G06F 11/006; G06F 2201/87; G06N 20/00; G06N 5/04; H04L 63/0876; H04L 63/102; H04L 67/12
See application file for complete search history.

(56) References Cited

U.S. PATENT DOCUMENTS

| | | | |
|---|---|---|---|
| 2018/0167476 A1 | 6/2018 | Hoffner et al. | |
| 2018/0350024 A1* | 12/2018 | Kaufman | G06Q 50/30 |
| 2019/0173951 A1 | 6/2019 | Sumcad et al. | |

FOREIGN PATENT DOCUMENTS

| | | | |
|---|---|---|---|
| WO | 2020/152213 A1 | 7/2020 | |
| WO | WO-2022029729 A1 * | 2/2022 | G06F 11/006 |

OTHER PUBLICATIONS

Ramachandran, et al., "Trinity: A Distributed Publish/Subscribe Broker with Blockchain-based Immutability", arxiv.org, Cornell University Library, 201 Olin Library Cornell University Ithaca, NY 14853,XP081239379, Jun. 12, 2018, 08 Pages.

International Search Report and Written Opinion of PCT Application No. PCT/IB2021/057292, dated Nov. 30, 2021, 07 pages.

Nasim, et al., "Mobile Publish/Subscribe System for Intelligent Transport Systems over a Cloud Environment", International Conference on Cloud and Autonomic Computing, 2014, 09 pages.

* cited by examiner

| Region Name | Population in Region | Total number of vehicles | Vehicles currently in use | Transaction Volume (per min) | Today's Transaction Sales (USD) | Status of ticket readers | Status of broker node devices | Status of subscriber nodes | Status of distributed ledger nodes |
|---|---|---|---|---|---|---|---|---|---|
| Region-1 | 1,000,000 | 200,000 | 180,000 | 400 | 2,160,000 | 85% Online | 98% Online | 91% Online | 99% Online |
| Region-2 | 1,20,000 | 250,000 | 200,000 | 320 | 1,728,000 | 82% Online | 97% Online | 90% Online | 98% Online |
| Region-3 | 750,000 | 150,000 | 110,000 | 260 | 1,404,000 | 81% Online | 95% Online | 88% Online | 97% Online |
| Region-4 | 1,350,000 | 300,000 | 230,000 | 345 | 1,863,000 | 90% Online | 99% Online | 92% Online | 96% Online |
| Region-5 | 550,000 | 120,000 | 100,000 | 210 | 1,134,000 | 95% Online | 98% Online | 94% Online | 98% Online |

FIG. 3B

| Transaction Correlation ID | Publisher node | Station ID (First Server) | Broker Node Device | Subscriber Node | Distributed Ledger Node | Transaction Status | Root Cause For Transaction Failure |
|---|---|---|---|---|---|---|---|
| TM01 | G1 | ST001 | V1 | SUB1 | Node 1-1 | Success | ----- |
| TM02 | G2 | ST001 | V1 | SUB1 | Node 1-1 | Failure | Power down at broker node device |
| TM03 | G3 | ST001 | V1 | SUB1 | Node 1-1 | Failure | Network communication error at server |
| TM04 | G4 | ST001 | V1 | SUB1 | Node 1-1 | Failure | Authentication error at publisher node |
| TM05 | G1 | ST002 | B1 | SUB2 | Node 1-2 | Failure | Authentication error of transaction message |
| TM06 | G2 | ST002 | B1 | SUB2 | Node 1-2 | Failure | Authentication error at broker node device |
| TM07 | G1 | ST003 | B1 | SUB3 | Node 2-1 | Failure | Message handling capacity overload at subscriber node |
| TM08 | G2 | ST003 | B1 | SUB3 | Node 2-1 | Failure | Application error at subscriber node |
| TM09 | G1 | ST004 | B2 | SUB4 | Node 2-2 | Failure | Operational failure at publisher node |
| TM10 | G2 | ST004 | B2 | SUB4 | Node 2-2 | Failure | Failure at publisher node due to vehicle delay/unavailability |

FIG. 3C

| Transaction Correlation ID | Ticket Readers | Broker Node Devices | Subscriber Nodes | Distributed Ledger Nodes-MP | Distributed Ledger Nodes-MaaS | Actual Trans-actions | Average Trans-actions | Transaction Status | Alert Category |
|---|---|---|---|---|---|---|---|---|---|
| TM01 | RDR-1 | BRK-A | SUB-C | BC-MP-A | BC-MA-C | 41 | 50 | Normal | Green |
| TM02 | RDR-2 | BRK-A | SUB-D | BC-MP-B1 | BC-MA-D | 0 | 30 | Trouble | Red |
| TM03 | RDR-3 | BRK-A | SUB-E | BC-MP-B2 | BC-MA-D | 0 | 20 | Trouble | Red |
| TM04 | RDR-6 | BRK-B | SUB-F | BC-MP-C1 | BC-MA-E | 50 | 30 | Jam (Over capacity) | Yellow |
| TM05 | RDR-7 | BRK-C | SUB-G | BC-MP-C2 | BC-MA-E | 45 | 20 | Jam (Over capacity) | Yellow |

FIG. 3D

| Region Name | Operational Trouble | Route Cause of Operational Trouble | Predicted Future Impact on Operations of MaaS Network |
|---|---|---|---|
| Region-1 | Shut down of 25% of station gates | Earthquake of magnitude 5 on Richter scale | Non-availability of metro services for the next 3 hours. |
| Region-2 | Traffic stoppages due to curfew | Pandemic/epidemic | Non-availability of cab services on weekends and between 7PM to 7AM on weekdays. |
| Region-3 | Delay in arrival of vehicles by 30 minutes | Accident on a major crossing | Delay in arrival of vehicles by 35-45 minutes for the next 1 hour for vehicles using the major crossing. |
| Region-4 | Delay in arrival of vehicles by 1 hour | Traffic diversion due to protests/processions | Delay in arrival of vehicles by 65-90 minutes for the next 2 hours for vehicles facing route diversion. |
| Region-5 | Delay in arrival of vehicles by 45 minutes | Traffic jams during peak hours | Delay in arrival of vehicles by 50-60 minutes for the next 2 hours. |
| Region-6 | Road evacuation and closure of sea/air-ports | Tsunami/cyclone expected in next 24 hours | Non-availability of all modes of transport for next 48 hours. |
| Region-7 | Closure of air traffic over the region | Volcano eruption expected in next 48 hours | Non-availability of flights for next 72 hours. |

FIG. 3E

| Publisher node (Transaction message correlation ID and Timestamp) | Broker node (Transaction message correlation ID for received messages/notifications) | Subscriber nodes (Transaction message correlation ID for received messages) | Transaction Status | Root cause of failure (if transaction failed) |
|---|---|---|---|---|
| P1: TM01 at 11:23:11 on 01/01/20 | B1: TM01 received from P1 at 11:23:55 on 01/01/20 | | --- | --- |
| | B1: Notification for TM01 received from S1 at 11:25:30 on 01/01/20 | S1: TM01 received at 11:24:03 on 01/01/20 | Success | --- |
| P2: TM02 at 12:20:04 on 01/01/20 | B1: TM02 received from P2 at 12:22:02 on 01/01/20 | | --- | --- |
| | B1: Operation information of S2 received (indicating S2 is down) | S2: Operationally down | Failure | S2 down due to message handling overload capacity. Click here for solutions |

FIG. 3F

| Transaction Failure Statistics for Mobility Providers | | | | | |
|---|---|---|---|---|---|
| Mobility Provider | Success Rate | Failure Rate | View Failure types | View Transaction messages | View/Configure Solutions for failure |
| MP1 | 65% | 35% | Click here | Click here | Click here |
| MP2 | 80% | 20% | Click here | Click here | Click here |
| MP3 | 75% | 25% | Click here | Click here | Click here |

FIG. 3J

| Publisher node (Transaction message correlation ID and timestamp) | Broker node (Transaction message correlation ID for received messages/ notifications) | Subscriber node (Transaction message correlation ID for received messages) | Transaction Status | Root cause of failure (if transaction failed) |
|---|---|---|---|---|
| P1: TM01 at 11:28:10 on 01/01/20 | B1: TM01 received from P1 at 11:29:00 on 01/01/20<br><br>B1: Operation information of S1 received (indicating S1 is down) at 11:30:00 on 01/0/20 | S1: Operationally troubled | -- | -- |
|  |  |  | Failure | S1 down due to application error at 11:30:00 on 01/01/20 |
| P2: TM02 at 11:32:00 on 01/01/20 | B1: TM02 received from P2 at 12:22:02 on 01/01/20<br><br>B1: Notification for TM02 received from S1 at 11:32:30 on 01/01/20 | S1: TM02 received at 11:32:25 on 01/01/20<br><br>S1: Generate notification with timestamp as 11:32:25; 01/01/20 | -- | -- |
|  |  |  | Success | Recovery time of S1: = 11:32:25 – 11:30:00 = 2 min 25 sec |

USER INTERFACE-BASED MOBILITY TRANSACTION MANAGEMENT ON A MAAS PLATFORM

CROSS-REFERENCE TO RELATED APPLICATIONS/INCORPORATION BY REFERENCE

None.

FIELD

Various embodiments of the disclosure relate to Mobility-as-a-Service (MaaS) and distributed ledger technology. More specifically, various embodiments of the disclosure relate to a system and method for user interface-based mobility transaction management on a MaaS platform.

BACKGROUND

In a traditional Mobility-as-a-Service (MaaS) platform, multiple transportation providers may provide their services through infrastructures, which may be based on a closed platform. Each of such transportation provider may have a separate ticket processing infrastructure (e.g., ticketing gates and Point-of-Sale (PoS) devices) or a separate application (e.g., a ticket booking application, ticket processing application, and a ride hailing application) to create, pay for, or manage a trip.

Typically, the MaaS platform may include a large number of nodes associated with each transportation provider. A MaaS transaction may be based on transmission of messages between the nodes of the MaaS platform. A MaaS transaction may fail if the transmission of messages associated with the transaction fail at one or more nodes of the MaaS platform. In certain situations, due to the large number of nodes and a large of number of transactions associated with the MaaS platform, it may be cumbersome to determine appropriate reason for the failure of transactions. Thus, there may be a need of a system which may effectively analyze the nodes and the transactions of the MaaS platform.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for user interface-based mobility transaction management on a Mobility-as-a-Service (MaaS) platform, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 3B illustrates an exemplary UI for display of telemetry information related to transactions on a MaaS network, in accordance with an embodiment of the disclosure.

FIG. 3C illustrates an exemplary UI for display of MaaS transaction flow and root causes of transaction failures, in accordance with an embodiment of the disclosure.

FIG. 3D illustrates an exemplary UI for display of status of transaction messages on different transaction message routes on a MaaS network, in accordance with an embodiment of the disclosure.

FIG. 3E illustrates an exemplary UI for display of predicted future impact of operational troubles on an operation of a MaaS network, in accordance with an embodiment of the disclosure.

FIG. 3F illustrates an exemplary UI for display of transaction message log and root cause determination, in accordance with an embodiment of the disclosure.

FIG. 3J illustrates an exemplary UI for display of transaction failure statistics across mobility providers of a MaaS network, in accordance with an embodiment of the disclosure.

FIG. 3K illustrates an exemplary UI for display of recovery time for an operationally troubled node of a MaaS network, in accordance with an embodiment of the disclosure.

DETAILED DESCRIPTION

Figure 1:
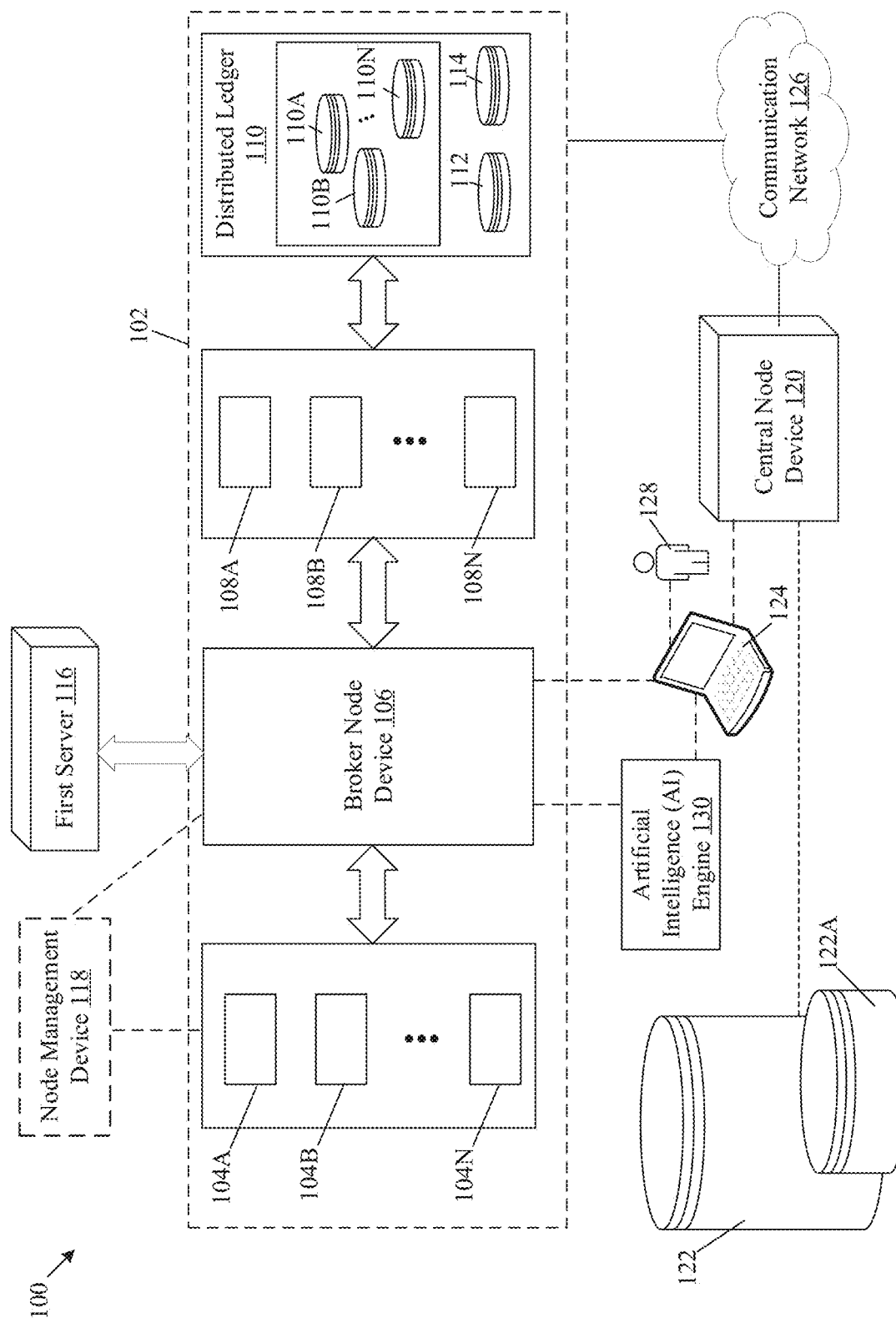
FIG. 1 is a diagram of an exemplary network environment for user interface-based mobility transaction on a Mobility-as-a-Service (MaaS) network, in accordance with an embodiment of the disclosure.

The following described implementations may be found in the disclosed system and method for user interface-based mobility transaction management on a Mobility-as-a-Service (MaaS) network. The disclosed system may be a part of a federated transportation management system that may facilitate multiple homogeneous or heterogenous transportation providers and their infrastructure, such as ticketing gates, applications, and/or Point of Sale (PoS) devices to operate on the MaaS network to provide various transportation services. Each transportation provider may enjoy secure data ownership and may control co-use of relevant transaction data through the distributed ledger. This may enhance connectivity between the various transportation providers.

Exemplary aspects of the disclosure provide a system that may include a broker node device associated with one or more MaaS networks. The broker node device may be configured to collect operation information (such as network connectivity status and a device operational status) associated with a first plurality of nodes of a first MaaS network. Based on the collected operation information, the broker node device may determine an operational trouble associated with one or more nodes of the first plurality of nodes. The one or more nodes may be nodes that may handle ticket transactions associated with a trip plan of a sequence of trip plans included in a MaaS mobility service. For example, the one or more nodes may include publisher nodes of a first MaaS network, subscriber nodes of the first MaaS network, or nodes of a distributed ledger associated with the subscriber nodes of the first MaaS network. Examples of the operational troubles of the one or more nodes may include, but are not limited to, a network connectivity failure, an operational failure, an application error, an overload of message handling capacity, an inability to process ticket transactions due to unavailability of a transport vehicle at a planned trip time or a delayed arrival of the transport vehicle for a pickup or drop in comparison to the planned trip time.

The broker node device may receive a first transaction message, which may be associated with a first transaction of a first transportation service of the first MaaS network. The first transaction message may be received from a first publisher node of the first plurality of nodes of the first MaaS network. Moreover, the first transaction message may include a first correlation identifier (ID) that may be generated by the first publisher node based on a generation of the first transaction message. In accordance with an embodiment, the first correlation ID may be a unique identifier associated with the first transaction message. The first correlation ID may be utilized to track the first transaction message associated with the first transaction.

The broker node device may further receive, from a second node of the first plurality of nodes of the first MaaS network, a first notification associated with a receipt of the first transaction message at the second node. The first notification may include the first correlation ID included in the first transaction message. In one or more embodiments, the second node may be any node (for example, a subscriber node or a broker node device) of the first plurality of nodes of the first MaaS network. Based on the first notification, the broker node device may determine that the first transaction message may be successfully received at the second node of the first MaaS network.

Moreover, the broker node device may further determine a cause for failure of the first transaction based on one of or combination of the first correlation ID, the received first notification, or the determined operational trouble. In accordance with an embodiment, the cause for failure may include, but are not limited to, the operational trouble associated with the broker node device, an operational trouble associated with a first server associated with the first publisher node and the broker node device, an operational trouble of one of the first plurality of nodes, or an authentication/authorization error. The broker node device may further control a display device to display the determined cause for failure of the first transaction. In some embodiments, the determined cause for failure may be displayed on a UI associated with the display device. Based on the determination of the cause for failure of the first transaction, the disclosed system may enable the administrator of the broker node device (or of the first MaaS network) to perform an impact analysis or a root cause analysis associated with a failure of the first transaction or any other transaction of the first MaaS network. For example, based on an identification of nodes of the first MaaS network that may be non-operational, an identification of a type of operational trouble of such non-operational nodes, an identification of the second node which may have successfully received (or not received) the first transaction message, and/or based on the first correlation ID of the first transaction message, the disclosed system may determine an display (via UI) which node(s) may have caused the transaction failure and what may be the cause for the failure of the first transaction. Thus, the cause of failure may be determined based on one or more of the operational trouble of the one or more nodes, the first correlation ID, and the first notification received from the one or more nodes.

The disclosed system of the first MaaS network may further indicate transaction failures through transaction message logs on the user interface (UI) and recommend solutions for the transaction failures based on the transaction message logs. The disclosed system may enable the administrator of the first MaaS network to rectify the transaction failures (e.g., based on root causes of transaction failures), through the UI. The disclosed system may allow the administrator of the first MaaS network to view (via the UI of the display device) the cause of failures of unsuccessful transactions and further rectify the failures to improve transaction throughput of the first MaaS network. For example, through the UI, the disclosed system may receive a user-input (or manual input) from the administrator to manage routing information and configuration associated with the nodes and to backup or restore operationally troubled nodes of the first MaaS network. Further, an Artificial Intelligence (AI) engine (or a trained machine learning model) associated with the broker node device of the disclosed system may provide automatic recommendations to rectify the operational troubles and/or transaction failures. The disclosed system may also display such recommendations to the administrator through the UI. Examples of the recommendations may include, but are not limited to, alternate routes, backup nodes for failed transactions, or switch between nodes/routes of different mobility providers. Thus, the disclose system may provide a UI based management of mobility transaction for MaaS networks.

FIG. 1 is a diagram of an exemplary network environment for user interface-based mobility transaction management on a Mobility-as-a-Service (MaaS) network, in accordance with an embodiment of the disclosure. With reference to FIG. 1, there is shown a block diagram of a network environment 100. The network environment 100 may include a system 102. The system 102 may include a first plurality of nodes. The system 102 may correspond to a first MaaS network. The first plurality of nodes may include a plurality of publisher nodes 104A-104N and a plurality of subscriber nodes 108A-108N. The system 102 may further include a broker node device 106 and a distributed ledger 110. The distributed ledger 110 may include a plurality of nodes such as a first ledger node 110A, a second ledger node 110B and an Nth ledger node 110N. The distributed ledger 110 may further include a counter party node 112 (i.e. which may be a MAAS player node), and a consensus node 114 (i.e. which may be a node that may execute consensus algorithms in the distributed ledger 110). For example, the consensus node 114 may be a notary node, in case of a Corda distributed ledger.

Furthermore, the network environment 100 may include a first server 116 and a node management device 118. The network environment 100 may further include a central node device 120 that may include a central storage repository 122. The central storage repository 122 may include a central routing configuration repository 122A. Moreover, the network environment 100 may include an Information Technology (IT) system 124 which may be managed by an IT administrator 128 associated with the first MaaS network. The central node device 120 and the system 102 may be communicatively coupled via a communication network 126. The network environment 100 may further include an Artificial Intelligence (AI) engine 130 (or a trained machine learning model) that may be communicatively coupled to the broker node device 106 and the IT system 124. In FIG. 1, the number of first plurality of nodes are merely presented as an example and should not be construed as limiting for the disclosure. The present disclosure may also be applicable to more or a lesser number of nodes, without a deviation from the scope of the disclosure.

The first MaaS network may support a standard specification for communication. The plurality of publisher nodes 104A-104N (for example, ticket readers) of all mobility providers across the first MaaS network may follow a standard or common communication protocol for data exchange. The first MaaS network may include homogeneous publisher nodes that may follow the MaaS standard specification for communication. The first MaaS network may further include heterogeneous publisher nodes that may follow proprietary communication protocols. The first MaaS network may offer a plug-in based support to the publisher nodes so that such heterogeneous publisher nodes can be supported until the respective mobility providers adhere to and provide support for the MaaS standard specification for communication.

The first MaaS network may provide a plugin architecture for the publisher nodes associated with different transportation providers to join the first MaaS network. Through a node management device (such as the node management device 118), the first MaaS network may provide bulk cluster management of the publisher nodes. All the publisher nodes may follow set protocols to operationalize on the first MaaS network. The set protocols may mandate a common security architecture (for publisher node authentication and authorization), a network protocol (e.g., HTTP, MQTT, AMQP, and the like), a uniform data request or response format (e.g., JSON, CSV, or XML format), and an API/data scheme. This may ensure that each publisher node follows a cluster-level configuration (such as a device profile including a company name, a company ID, a gate ID, a gate number, and the like) and a device-level certificate (i.e., the authentication credential). The pattern of cluster-level configuration and the set protocols may facilitate transport providers to deploy new publisher nodes or replace existing publisher nodes with a plug-and-play approach. This may facilitate the first MaaS network to function as a homogeneous transportation network with interoperability between resources (such as publisher node devices) of the various transportation providers.

The plurality of publisher nodes 104A-104N may include suitable logic, circuitry, code, and/or interfaces that may be configured to operate as a ticket processing client for a mobility service (such as a transport service) of a respective mobility provider (such as a transportation provider). For example, as a ticket processing client, the plurality of publisher nodes 104A-104N may read, issue, recharge, or cancel tickets to create events associated with the respective transport service. Based on such events, transaction messages may be communicated to one or more subscriber nodes (such as, the plurality of subscriber nodes 108A-108N) of the first MaaS network through the broker node device 106. Examples of the plurality of publisher nodes 104A-104N may include, but are not limited to, a consumer electronic device with a trip planning or booking application, a ticket reader on a ticketing gate, a ticketing kiosk a Point-of-Sale (PoS) device, a mobile POS, a ticket vending machine, a smart door of a transport vehicle which may read a ticket to start or end a ride.

The plurality of subscriber nodes 108A-108N may include suitable logic, circuitry, code, and/or interfaces that may be configured to receive the transaction messages, through the broker node device 106, from one or more of the plurality of publisher nodes 104A-104N. Each transaction message may include a topic which may be subscribed by one or more subscriber nodes of the plurality of subscriber nodes 108A-108N. Examples of implementation of a subscriber node may include, but are not limited to, a web server, an edge device, an edge node, a cloud server, a cluster of cloud-based servers, a workstation, or any computing device with a fog computing capability.

A first publisher node 104A of the plurality of publisher nodes 104A-104N and a first subscriber node 108A of the plurality of subscriber nodes 108A-108N may be associated with a first transportation provider. Other nodes, such as a second publisher node 104B and a second subscriber node 108B may be associated with the first transportation provider or a second transportation provider which may be different from the first transportation provider.

The broker node device 106 may include suitable logic, circuitry, code, and/or interfaces that may be configured to route transaction messages from a publisher node (such as the first publisher node 104A) to a subscriber node (such as the first subscriber node 108A). Decisions to authorize the broker node device 106 to route such transaction messages to the subscriber nodes may be determined by the first server 116. Example implementations of the broker node device 106 may include, but are not limited to, an application server, a cloud server, a mainframe server, a database server, a web server, or other type of servers.

The broker node device 106 may be configured to communicate with each of the plurality of publisher nodes 104A-104N and the plurality of subscriber nodes 108A-108N through a suitable publish-subscribe network protocol, such as, but not limited to, a Message Queuing Telemetry Transport (MQTT)-based messaging protocol, an Advanced Message Queuing Protocol (AMQP)-based messaging protocol, or a Message-Oriented Middleware (MOM)-based messaging framework.

The plurality of subscriber nodes 108A-108N may be associated with a corresponding node of the distributed ledger 110. For example, the first subscriber node 108A may be associated with the first ledger node 110A of the distributed ledger 110, the second subscriber node 108B may be associated with the second ledger node 110B of the distributed ledger 110, . . . and the Nth subscriber node 108N may be associated with the Nth ledger node 110N of the distributed ledger 110.

In an embodiment, at least two ledger nodes of the distributed ledger 110 may store transaction data associated with a MaaS transportation service. The MaaS transportation service may be associated with one or more of: the plurality of transportation providers and/or a user who may avail the MaaS transportation service through a unified MaaS interface or through the plurality of publisher nodes 104A-104N. The transaction data associated with the MaaS transportation service may be included in a set of state objects, such as an initial state object and an updated version of the initial state object. Each state object may include a smart contract, a contract code (or rules of a transaction upon which parties to the transaction agree), and state properties (that may be updated when the transaction data is updated based on transaction requests from the plurality of publisher nodes 104A-104N).

The counter-party node 112 and the consensus node 114 may be associated with the distributed ledger 110. For example, the distributed ledger 110 may include the counter-party node 112 (also referred to as a MaaS provider node) and the consensus node 114.

In at least one embodiment, the distributed ledger 110 may be a decentralized and distributed database system that may maintain an immutable record of data operations or transactions. A set of data operations may be grouped together as a block and may be further linked to a previous block of data operations to form a chain of a plurality of blocks. All blocks of data operations may be stored in a decentralized manner, whereby at least two participants or nodes of the distributed ledger 110 may store a subset of the plurality of blocks associated with one or more transactions in which the at least two participants or nodes may participate. Further, the distributed ledger 110 may include an operating system (for example, a Java Virtual Machine (JVM)) which may allow for deployment of a smart contract between multiple parties, for example, mobility provider node(s) of the first transportation provider) and the counter-party node 112 (i.e. the MaaS provider node).

By way of example, and not limitation, the distributed ledger 110 may be a Corda blockchain, an Ethereum blockchain, or a Hyperledger blockchain. The distributed ledger 110 may store a set of immutable state objects that may be tracked by the distributed ledger 110. The state object may include transaction data, such as a smart contract between parties, contract code (rules of transaction), and content including state properties with certain state values. The smart contract may include a set of conditions under which multiple parties to the smart contract may agree to interact with each other. The smart contract may run on one or more nodes of the distributed ledger 110 and may govern transitions between state objects to generate a transaction. The smart contract may be written once, reused for a large numbers of state objects, and may refer to a governing legal prose by way of cryptographic hashes.

The distributed ledger 110 may use secure cryptographic hashes to identify parties and data and also to link a state object to a previous version of the state object to provide chains of provenance. A transaction between a group of parties may be stored on the distributed ledger 110 such that only the group of parties associated with the transaction may be able to view the transaction. A party associated with a transaction may store a current state object of the transaction in a vault (a database associated with the distributed ledger 110). Another party eligible to view or process the transaction (e.g., validate the transaction) may retrieve the current state object of the transaction from the vault. Additionally, each state object of the distributed ledger 110 may include a smart contract between the parties or nodes that may participate in an associated transaction.

On the distributed ledger 110, a participant or a node (for example, the first ledger node 110A) may update a transaction by updating state properties of an input state object (for example, the first state object) to produce an output state object (for example, the second state object). The updated transaction may thereby create a chain of provenance (which may be associated with the transaction data). The distributed ledger 110 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. Further, a consensus node (e.g., the consensus node 114) associated with the distributed ledger 110 may determine the uniqueness of the updated transaction based on a check that there exists no other transaction that has reached a consensus by use of the same input state object as the current transaction.

In accordance with an embodiment, the distributed ledger 110 may be associated with a decentralized application that may include a client-side interface (a front-end) and a server-side interface (a back end). The decentralized application may be configured to implement a workflow (e.g., a Corda flow) associated with the blockchain to record a transaction on a node of the distributed ledger 110 (such as the first ledger node 110A of the distributed ledger 110). The client-side interface may be hosted on each of the plurality of subscriber nodes 108A-108N and the client-side interface may be configured to load up on a client associated with a subscriber node. For example, the client-side interface of the decentralized application may be a Remote Procedure Call (RPC) client that may be configured on each subscriber node and the counter-party node 112 (i.e. the MaaS provider node). The server-side interface of the decentralized application may run on each node of the distributed ledger 110 associated with a corresponding subscriber node and the counter-party node 112.

In an embodiment, the transaction request from a publisher node may initiate a MaaS transaction between a mobility provider node (such as the first ledger node 110A of the distributed ledger 110) and a MaaS provider node (i.e. the counter-party node 112). The distributed ledger 110 may store records for the MaaS transaction between two parties, i.e., the mobility provider node (e.g., the first ledger node 110A of the first mobility provider) and the MaaS provider node (i.e. the counter-party node 112).

In case of multiple MaaS providers, an exemplary implementation may include a plurality of MaaS provider nodes, each of which may be associated with a certain MaaS provider and may be included in a separate distributed ledger for the respective MaaS provider. In certain scenarios, the plurality of MaaS provider nodes may be included in a common distributed ledger, such as the distributed ledger 110.

In an embodiment, the first ledger node 110A may be one of many database nodes of the distributed ledger 110 and may be configured to receive a transaction message via the first subscriber node 108A. The first ledger node 110A may be configured to update an initial state object associated with the distributed ledger 110 based on the transaction message to output an updated state object. The first ledger node 110A may build a transaction that may include the initial state object with initial transaction data and the updated state object with updated transaction data.

The counter-party node 112 may be associated with a MaaS provider and may be also referred to a MaaS provider node. In an embodiment, the counter-party node 112 may include suitable logic, circuitry, code, and/or interfaces that may be configured to process a transaction message received from a subscriber node of the plurality of subscriber nodes 108A-108N via mobility provider node. The consensus node 114 may include suitable logic, circuitry, code, and/or interfaces that may be configured to notarize a transaction associated with the distributed ledger 110.

The first server 116 may include suitable logic, circuitry, code and/or interfaces that may be configured to operate as an authentication/authorization (auth) server for node devices which may request to be commissioned as (active) ticket processing clients of the first MaaS network (represented by the system 102). For example, the first server 116 may authenticate a publisher node (such as, the first publisher node 104A) to operate as a (valid) ticket processing client for the first MaaS network. When the publisher node may be authenticated, the first server 116 may act as an authorization server and may authorize the broker node device 106 to route transaction requests (or the transaction message) from the authenticated publisher node device to a subscriber node device (such as, the first subscriber node 108A). Examples of the first server 116 may include, but are not limited to, an application server, a cloud server, a mainframe server, a database server, a web server, or other type of servers.

In FIG. 1, the first server 116 is shown as a separate entity from the broker node device 106. However, the scope of the disclosure may not be so limiting and in some embodiments, the entire functionality of the first server 116 and the broker node device 106 may be incorporated in an intelligent broker device, without a deviation from the scope of the disclosure. Further, in certain scenarios, each of the plurality of publisher nodes 104A-104N may be directly interfaced to the first server 116 for authentication prior to transmission of transaction messages to the broker node device 106.

The node management device 118 may include suitable logic, circuitry, code, and/or interfaces that may be configured to monitor the first publisher node 104A and the first subscriber node 108A to determine an operational state of the first publisher node 104A and the first subscriber node 108A. In case the operational state of the first publisher node 104A is an inactive state, the node management device 118 may be responsible for operationalization of a backup publisher node as a replacement of the first publisher node 104A. In another case, if the operational state of the first subscriber node 108A is an inactive state, the node management device 118 may be responsible for operationalization of a backup subscriber node as a replacement of the first subscriber node 108A. Examples of the node management device 118 may include, but are not limited to, a mobile diagnostic computer, a web server, an edge device, an edge node, a cloud server, a cluster of cloud-based servers, a workstation, or any computing device or system with a fog computing capability.

The central node device 120 may include suitable logic, circuitry, code, and/or interfaces that may be configured to store relationships among individual nodes (e.g., the plurality of publisher nodes 104A-104N, the plurality of subscriber nodes 108A-108N, and the broker node device 106) in the form of routing information. For example, the central node device 120 may store the routing information associated with the first publisher node 104A as a routing configuration in the central storage repository 122. Examples of implementation of the central node device 120 may include, but are not limited to, a web server, an edge device, an edge node, a cloud server, a cluster of cloud-based servers, a workstation, or any computing device or system with a fog computing capability.

In accordance with an embodiment, the central storage repository 122 may include a central routing configuration repository 122A for storage of the routing information. Additionally, the central storage repository 122 may also store node information associated with each node of the first plurality of nodes and the broker node device 106. Examples of the central storage repository 122 may include, but are not limited to, a web server, a cloud server, or a local storage device.

The IT system 124 may include suitable logic, circuitry, code, and/or interfaces that may be configured to display the determined cause for failures for the transaction related to the first MAAS network. In an embodiment, the IT system 124 may include a display device (not shown) to display the routing information, the operation information, the operational trouble, identification information of the first publisher node 104A, identification information of the one or more nodes, first correlation identifier (ID) associated with a transaction message, master configuration information associated with the first MaaS network, telemetry information associated with the transactions of the first MaaS network, or transaction statuses associated with one or more routes of the first MaaS network. In some embodiment, the IT system 124 may transmit a release schedule to the central node device 120 for an update of the routing information stored locally on the first publisher node 104A. Examples of the IT system 124 may include, but are not limited to, a mainframe computer, a workstation, a laptop, a personal computer, a mobile phone, or any computing device.

The IT system 124 may receive a user input from the IT administrator 128. The user input may be a request to view transaction failure information associated with one or more nodes of the first MaaS network, where the transaction failure information may include the operation information, the operational trouble related to the one or more nodes of the first MaaS network or may include cause for failure for the transaction messages communicated with the plurality of publisher nodes 104A-104N and the plurality of subscriber nodes 108A-108N through the broker node device 106. In some embodiments, the user input may be associated with a selection of a backup publisher/subscriber node or an alternate node for an operationally troubled node of the first MaaS network. In some embodiments, the user input may be associated with the routing information, for example, the release schedule for the update of the routing information associated with the first publisher node 104A. For example, the user input is to set the release schedule for the update of the routing information. The IT system 124 may store the set release schedule in the central routing configuration repository 122A of the central storage repository 122 in the central node device 120. The central node device 120 may transmit the set release schedule to the first publisher node 104A for the update of the routing information to the first publisher node 104A.

The AI engine 130 may include suitable code, logic, circuitry, and/or interfaces that may be configured to provide recommendations to rectify or resolve transaction failures and/or operational troubles of one or more nodes of the first MaaS network. The AI engine 130 may be further configured to determine predicted future impacts of operational troubles on an operation of the first MaaS network. To provide the recommendations and/or determine the predicted future impacts, the AI engine 130 may use time series information or historical information (i.e. information related to operational status or failures on different nodes) associated with the first MaaS network for the classification of operation trouble events. The time series information or historical information may include tags associated with the operational trouble events, such as, but not limited to, location, mobility provider company, MaaS company, IT equipment. The tags may be associated with the classification of the operation trouble events. The AI engine 130 may use the tags for training of the AI engine 130 to generate the recommendations and determine the predicted future impact based on the classification of operation trouble events.

In an embodiment, the AI engine 130 may be based on a neural network. The neural network may be a computational network or a system of artificial neurons, arranged in a plurality of layers, as nodes. The plurality of layers of the neural network may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or while training the neural network on a training dataset.

Each node of the neural network may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different same mathematical function.

In training of the neural network, one or more parameters of each node of the neural network may be updated based on whether an output of the final layer for a given input (from the training dataset) matches a correct result based on a loss function for the neural network. The above process may be repeated for same or a different input till a minima of loss function may be achieved and a training error may be minimized. Several methods for training are known in art, for example, gradient descent, stochastic gradient descent, batch gradient descent, gradient boost, meta-heuristics, and the like.

The neural network of the AI engine 130 may include electronic data, such as, for example, a software program, code of the software program, libraries, applications, scripts, or other logic or instructions for execution by a processing device, such as circuitry of the AI engine 130. The neural network may include code and routines configured to enable a computing device, such as the circuitry of the AI engine 130, to perform one or more operations for classification of one or more inputs (for example operational troubles of nodes and/or cause for failure of transactions) into the recommended solutions for the rectification of transaction failures and/or to predict future impacts of operational troubles. Additionally, or alternatively, the neural network may be implemented using hardware including a processor, a microprocessor (e.g., to perform or control performance of one or more operations), a field-programmable gate array (FPGA), or an application-specific integrated circuit (ASIC). Alternatively, in some embodiments, the neural network may be implemented using a combination of hardware and software.

In an embodiment, the AI engine 130 may be separate from the broker node device 106 and the IT system 124 and may be communicatively coupled to both the broker node device 106 and the IT system 124. In another embodiment, the AI engine 130 may lie within the IT system 124 and may be communicatively coupled to the broker node device 106. In yet another embodiment, the AI engine 130 may lie within the broker node device 106 and may be communicatively coupled to the IT system 124.

The communication network 126 may include a communication medium through which each node of the first MaaS network may communicate with the central node device 120. Examples of the communication network 126 may include, but are not limited to, the Internet, a cloud network, a Wireless Fidelity (Wi-Fi) network, a Personal Area Network (PAN), a Local Area Network (LAN), or a Metropolitan Area Network (MAN). Various nodes of the first MaaS network may be configured to connect to the communication network 126, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the broker node device 106 may be configured to collect operation information associated with the first plurality of nodes (such as, the plurality of publisher nodes 104A-104N and the plurality of subscriber nodes 108A-108N) of the first MaaS network. In some embodiments, the broker node device 106 may also collect the operation information associated with the first server 116. Examples of the collected operation information may include, but are not limited to, a network connectivity status and a device operational status of each node of the first plurality of nodes. Details of the collection of the operation information associated with the first plurality of nodes are provided, for example, in FIG. 2.

The broker node device 106 may further be configured to determine operational trouble associate with one or more nodes (hereinafter, referred to as operationally troubled node(s)) of the first plurality of nodes of the first MaaS network, based on the collected operation information. Examples of the operational trouble may include, but are not limited to, a network connectivity failure, an operational failure, an application error, an overload of message handling capacity, an inability to process ticket transactions due to unavailability of a transport vehicle at a planned trip time or a delayed arrival of the transport vehicle for a pickup or drop in comparison to the planned trip time. Details of the determination of the operational trouble are provided, for example, in FIG. 2.

The broker node device 106 may further be configured to receive, from the first publisher node 104A of the first plurality of nodes of the first MaaS network, the first transaction message, which may be associated with the first transaction of the first transportation service of the first MaaS network. Examples of types of the first transaction message may include, but are not limited to, a create message (on a creation or issuance of a ticket for the mobility service), a get-in message (to begin the mobility service for the user), and a get-out message (upon completion of the mobility service for the user). The first transaction message may include the first correlation ID that may be generated by the first publisher node 104A based on a generation of the first transaction message. Details of the receipt of the first transaction message are provided, for example, in FIG. 2.

The broker node device 106 may further be configured to receive, from a second node of the first plurality of nodes of the first MaaS network, a first notification associated with a receipt of the first transaction message at the second node. In some embodiments, the second node may be, for example, a subscriber node of the plurality of subscriber nodes 108A-108N. In another embodiment, the second node may be for example, a server node (associated with the first server 116). Details of the first notification are provided, for example, in FIG. 3F.

The broker node device 106 may further be configured to determine a cause for failure of the first transaction based on at least one of the first correlation ID in the first transaction message, the received first notification, or the determined operational trouble. Examples of the cause of failure may include, but are not limited to, the operational trouble associated with the broker node device 106, an authentication error associated with the first publisher node 104A, the operational trouble associated with the first subscriber node 108A, or the operational trouble of the first publisher node 104A. Details of the determination of the cause for failure of the first transaction are provided, for example, in FIGS. 3A-3K.

The broker node device 106 may further be configured to control a display device to display the determined cause for failure of the first transaction. The broker node device 106 may present the determined cause for failure of the first transaction on a user interface (UI) of the display device. In an embodiment, the display device may be a display screen of the IT system 124. Details of the display of the determined cause for failure of the first transaction on the UI are provided, for example, in FIGS. 3A-3K. Based on the displayed cause for failure of the first transaction, the IT system 124 or the broker node device 106 may receive a first user input, from the IT administrator 128, related to update of routing information or configuration information of the nodes of the first MaaS network. The IT system 124 or the broker node device 106 may also receive a second user input, from the IT administrator 128, related to selection of backup or alternate nodes for backup of the operationally troubled nodes and/or operationalization of the operationally troubled nodes of the first MaaS network. The display of the cause for failure of the first transaction (or other transactions related to the first MaaS network) on the UI may enable the IT administrator 128 of the first MaaS network to manually rectify the transaction failure and improve transaction throughput of the first MaaS network. Further, the AI engine 130 may be configured to provide automated recommendations to rectify the operational troubles and/or transaction failures. The UI may also display such recommendations to the IT administrator 128. Examples of the recommendations may include, but are not limited to, alternate routes, backup nodes for failed transactions, or switch between nodes/routes of different mobility providers. Thus, the disclosed system may provide UI based mobility transaction management on a MaaS network.

Figure 2:
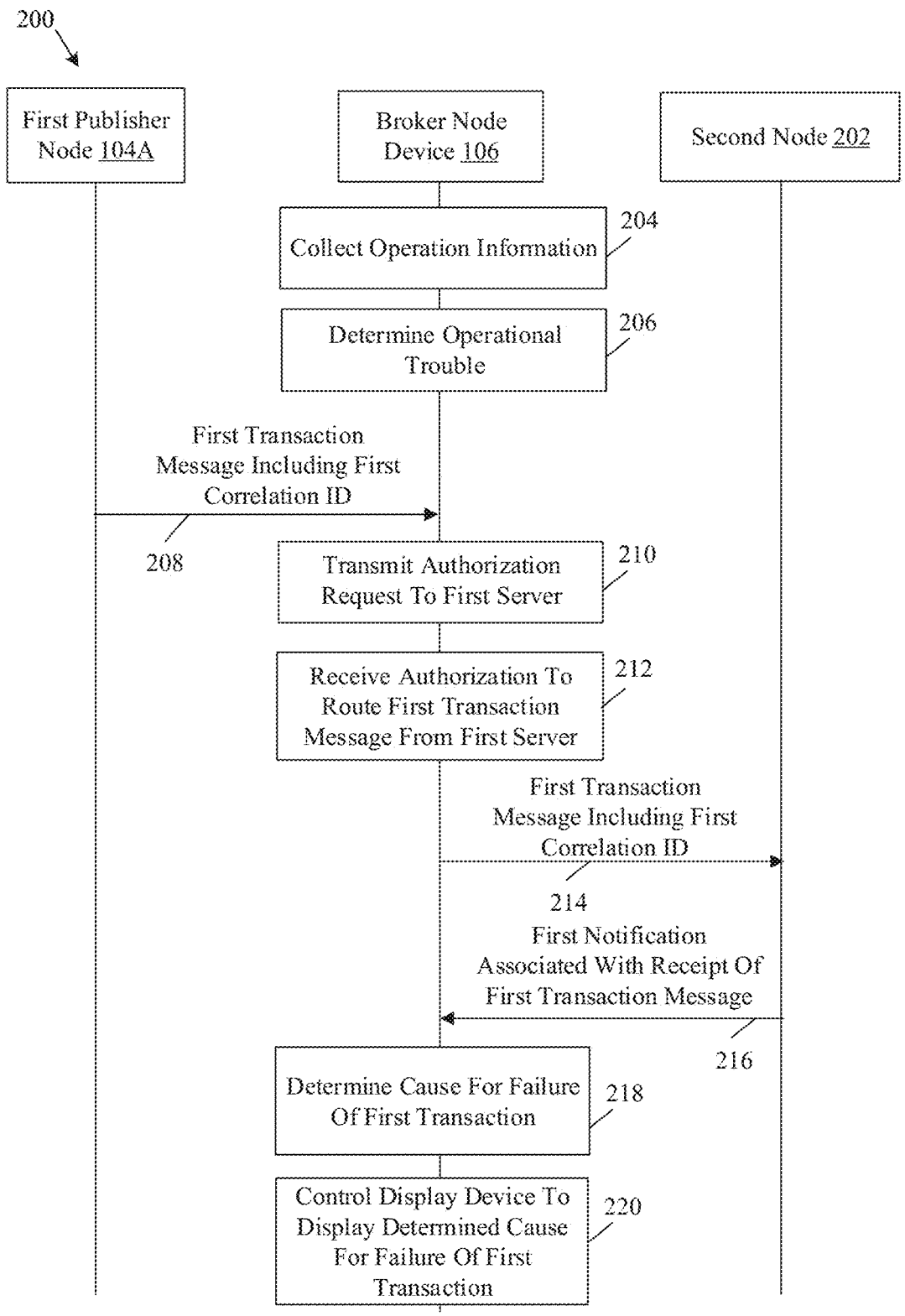
FIG. 2 is a sequence diagram that illustrates exemplary operations for user interface-based mobility transaction on a MaaS network, in accordance with an embodiment of the disclosure.

FIG. 2 is a sequence diagram that illustrates exemplary operations for user interface-based mobility transaction management on a MaaS network, in accordance with an embodiment of the disclosure. FIG. 2 is explained in conjunction with elements from FIG. 1. With reference to FIG. 2, there is shown a sequence diagram 200 that illustrates a sequence of operations from 204 to 220. The sequence of operations may be executed by various components of the system 102 of FIG. 1. The sequence diagram 200 shows the sequence of operations from 204 to 220 with reference to the first publisher node 104A, the broker node device 106 and a second node 202.

At 204, the operation information associated with the first plurality of nodes of the first MaaS network may be collected. In accordance with an embodiment, the broker node device 106 may be configured to collect the operation information associated with the first plurality of nodes of the first MaaS network. The broker node device 106 may also collect the operation information associated with the first server 116. In accordance with an embodiment, the collected operation information may include at least one of the network connectivity status or the device operational status associated with each of the first plurality of nodes of the first MaaS network. In some embodiments, prior to the collection of the operation information, the broker node device 106 may receive initial master configuration information related to each of the first plurality of nodes of the first MaaS network from the central storage repository 122. The master configuration information may include, but is not limited to, owner profile information (including a mobility provider company and a MaaS company), asset profile information (including a region of deployment and an identifier), and location information (including a name, an address, and geographical information) of each node of the first plurality of nodes. Based on the initial master configuration information, the broker node device 106 may send an instruction to each node of the first plurality of nodes (and the first server 116) to periodically send a heartbeat signal to indicate a current operation status (i.e. operation information) of the node to the broker node device 106. Based on receipt of such periodic heartbeat signals from each node of the plurality of nodes (and the first server 116), the broker node device 106 may collect the operation information of the respective nodes (and the first server 116).

In an embodiment, the broker node device 106 may also collect traffic information associated with an on-road fleet of transport vehicles of one or more mobility providers affiliated to the first MaaS network. The collected traffic information may include, for example, traffic congestion information, traffic collision information, detour information, information associated with a less than average traffic, and the like. For example, the broker node device 106 may collect the traffic information from Internet-of-Things (IoT) sensors that may be deployed on each vehicle of the on-road fleet of transport vehicles. Such sensors may determine a location of the vehicle, a temperature, a number of vehicles in vicinity, and a number of people who may be currently traveling in the vehicle. In some instances, the traffic information may be collected through an application programming interface (API) of a data aggregator for traffic information.

At 206, the operational trouble associated with one or more nodes of the first plurality of nodes (such as the plurality of publisher nodes 104A-104N and the plurality of subscriber nodes 108A-108N) of the first MaaS network and the first server 116, may be determined, based on the collected operation information. In accordance with an embodiment, the broker node device 106 may be configured to determine the operational trouble associated with one or more nodes of the first plurality of nodes of the first MaaS network and the first server 116. In accordance with an embodiment, the determined operational trouble of the one or more nodes (for example first publisher node 104A) of the first MaaS network include, for example, the network connectivity failure associated with the one or more nodes, the operational failure of the one or more nodes, the application error on the one or more nodes, the overload of a message handling capacity of the one or more nodes, or the inability of the one or more nodes to process ticket transactions due to unavailability of a vehicle at a planned trip time or a delayed arrival of the vehicle for a pickup or drop in comparison to the planned trip time.

At 208, the first transaction message, which may be associated with the first transaction of the first transportation service of the first MaaS network, may be received. The first transaction message may be received from the first publisher node 104A of the first plurality of nodes of the first MaaS network. In accordance with an embodiment, the broker node device 106 may be configured to receive the first transaction message. The first transaction message may include the first correlation ID that may be generated by the first publisher node 104A based on the generation of the first transaction message.

At 210, an authorization request associated with the received first transaction message may be transmitted to the first server 116. In accordance with an embodiment, the broker node device 106 may be configured to transmit the authorization request associated with the received first transaction message to the first server 116. The first server 116 may be associated with the broker node device 106 and the first publisher node 104A.

In some embodiments, the authorization request may include a first device profile and an authentication credential, associated with the first publisher node 104A. The first device profile may include, for example, a company name, a company identifier (ID), a station name, a station ID, a gate name, a gate ID, a geography, a region, an address associated with the first publisher node 104A, and the like. The authorization request may be transmitted to seek an authorization from the first server 116 to allow the broker node device 106 to route the first transaction message to the first subscriber node 108A and/or to another subscriber node of the first MaaS network. The broker node device 106 may receive the authorization request along with the first transaction message as a transaction request from the first publisher node 104A.

At 212, the authorization to route the first transaction message to the first subscriber node 108A of the first plurality of nodes of the first MaaS network, may be received, from the first server 116, based on the transmitted authorization request. In an embodiment, the broker node device 106 may be configured to receive the authorization from the first server 116. In one or more embodiments, the first transaction message received from the first publisher node 104A may be authenticated as a valid message based on the first device profile. In an embodiment, the first server 116 may authenticate the first transaction message as a valid message from the first publisher node 104A based on the first device profile. For example, the first server 116 may match attributes, such as the company name, the company ID, or the station ID in the first transaction message with the company name, the company ID, or the station ID in the first device profile (shared by the broker node device 106). In case of a mismatch, the first transaction message may be considered as invalid and flagged as malicious. In case of a match, the first transaction message may be authenticated as a valid message. The first server 116 may further authorize the broker node device based on the authenticated first transaction message.

In one embodiment, the first server 116 may validate the first device profile based on a search within a stored whitelist of device profiles associated with various transport providers. For example, one or more of the company name, the company ID, the station name, the station ID, the gate name, the gate ID, the geography, the region, or the address associated with the first publisher node 104A may be searched individually or as a combined string in the stored whitelist of device profiles to validate the first device profile. In another embodiment, the first server 116 may verify that the authentication credential associated with the first publisher node 104A is valid and the first publisher node 104A corresponds to a whitelisted publisher node device of the first transportation provider and the first MaaS network. Based on the validation of the first device profile and/or the verification of the authentication credential, the first server 116 may instruct the broker node device 106 to route the transaction message included in the transaction request to an appropriate subscriber node device (such as the first subscriber node 108A). Thus, the first server 116 may authenticate the first publisher node 104A based on the authentication credentials (i.e., device-level certificate) and the first device profile (i.e., cluster-level configuration) of the first publisher node 104A. Further, the first server 116 may authenticate the first transaction message to be routed by the broker node device 106 to the first MaaS network based on the authentication credentials and the first device profile.

At 214, the first transaction message that includes the first correlation ID may be transmitted to the second node 202 of the first MaaS network. In accordance with an embodiment, the broker node device 106 may be configured to transmit the first transaction message to the second node of the first MaaS network. The second node 202 may be, for example, a server node associated with the first server 116. In an exemplary embodiment, the second node 202 may be, for example, a subscriber node (for example, the first subscriber node 108A) of the plurality of subscriber nodes 108A-108N.

At 216, the first notification associated with a receipt of the first transaction message at the second node may be received, from the second node 202 of the first plurality of nodes. In accordance with an embodiment, the broker node device 106 may be configured to receive the first notification from the second node 202. In an exemplary embodiment, the first notification associated with the receipt of the first transaction message may indicate a success or failure of the receipt of the first transaction message (i.e. received from the first publisher node 104A) at the second node.

At 218, a cause for failure of the first transaction may be determined based on at least one of the first correlation ID in the first transaction message, the received first notification, or the determined operational trouble. In accordance with an embodiment, the broker node device 106 may be configured to determine the cause for failure of the first transaction. In some embodiments, the broker node device 106 may further receive the routing information associated with each of the first plurality of nodes of the first MaaS network from the central routing configuration repository 122A. The routing information may include routing rules for propagation of transaction requests or messages between the various nodes of the first plurality of nodes of the first MaaS network. The broker node device 106 may determine the cause for failure of the first transaction further based on the routing information.

For example, based on an identification of nodes of the first MaaS network that may be non-operational, the type of operational trouble of these non-operational nodes, an identification of the second node which may have successfully received the first transaction message, an identification of nodes of the first MaaS network that may receive the first transaction message (using the routing information), and/or the first correlation ID of the first transaction message, the broker node device 106 may determine which node(s) may have caused the transaction failure and what may be the cause for the failure of the first transaction. Thus, the cause of failure may be determined based on at least one of the operational trouble of the one or more nodes, the first correlation ID, the routing information, and the first notification, or combination.

In some embodiments, the cause for failure of the first transaction may be, for example, an operational trouble associated with the broker node device 106, an operational trouble associated with the first server 116, an authentication error associated with the first publisher node 104A, an authentication error associated with the first transaction message, an authorization error associated with the broker node device 106 for the first transaction message, the operational trouble associated with the first subscriber node 108A from the plurality of subscriber nodes 108A-108N, the operational trouble of the first publisher node 104A, and the operational trouble of the one or more nodes due to an accident of a vehicle associated with the first transportation service or a delay in arrival for a pickup or drop by the vehicle of the first transportation service. In another embodiment, the cause of failure of the first transaction may include, for example, a natural calamity (e.g., an earthquake, a tsunami, a cyclone, a storm, floods, or volcano eruption), a disaster (e.g., an accident on a major crossing, or a pandemic/epidemic), or traffic disruptions (e.g., protests/processions, traffic diversions due to an event/festival, or traffic jam in peak hours). Further, details of the first transaction message and the cause for failure for different transaction of the first MaaS network are described, for example, in FIGS. 3A-3K.

At 220, a display device may be controlled to display the determined cause for failure of the first transaction. In accordance with an embodiment, the broker node device 106 may be configured to control the display device to display the determined cause for failure of the first transaction. In an embodiment, the display device may be a display screen of the IT system 124. In some embodiments, the broker node device 106 may further control a graphical user interface (GUI) of the display device to display at least one of the routing information, the operation information, the operational trouble, identification information of the first publisher node, identification information of the one or more nodes, or the first correlation ID, master configuration information associated with the first MaaS network, telemetry information associated with the transactions of the first MaaS network, or transaction statuses associated with one or more routes of the first MaaS network. Moreover, the broker node device 106 may further control the display device to display a notification about the determined cause for failure of the first transaction. Examples of UIs associated with the display the cause of the transaction failure are illustrated and described, for example, in FIGS. 3A-3K.

In accordance with an embodiment, the broker node device 106 may be configured to determine the cause for failure for each of a plurality of transactions associated with the one or more nodes of the first MaaS network. The broker node device 106 may further control the display device to display the determined cause for failure for each of the plurality of transactions associated with the one or more nodes. The broker node device 106 may be further configured to determine a recovery time associated with an operationally troubled node of the one or more nodes, based on the determined cause for failure for each of the plurality of transactions associated with the one or more nodes. The broker node device 106 may further control the display device to display the recovery time associated with the operationally troubled node from the one or more nodes. An example of a UI that may be displayed to depict the recovery time associated with the operationally troubled node is described, for example, in FIG. 3K.

Figure 3A:
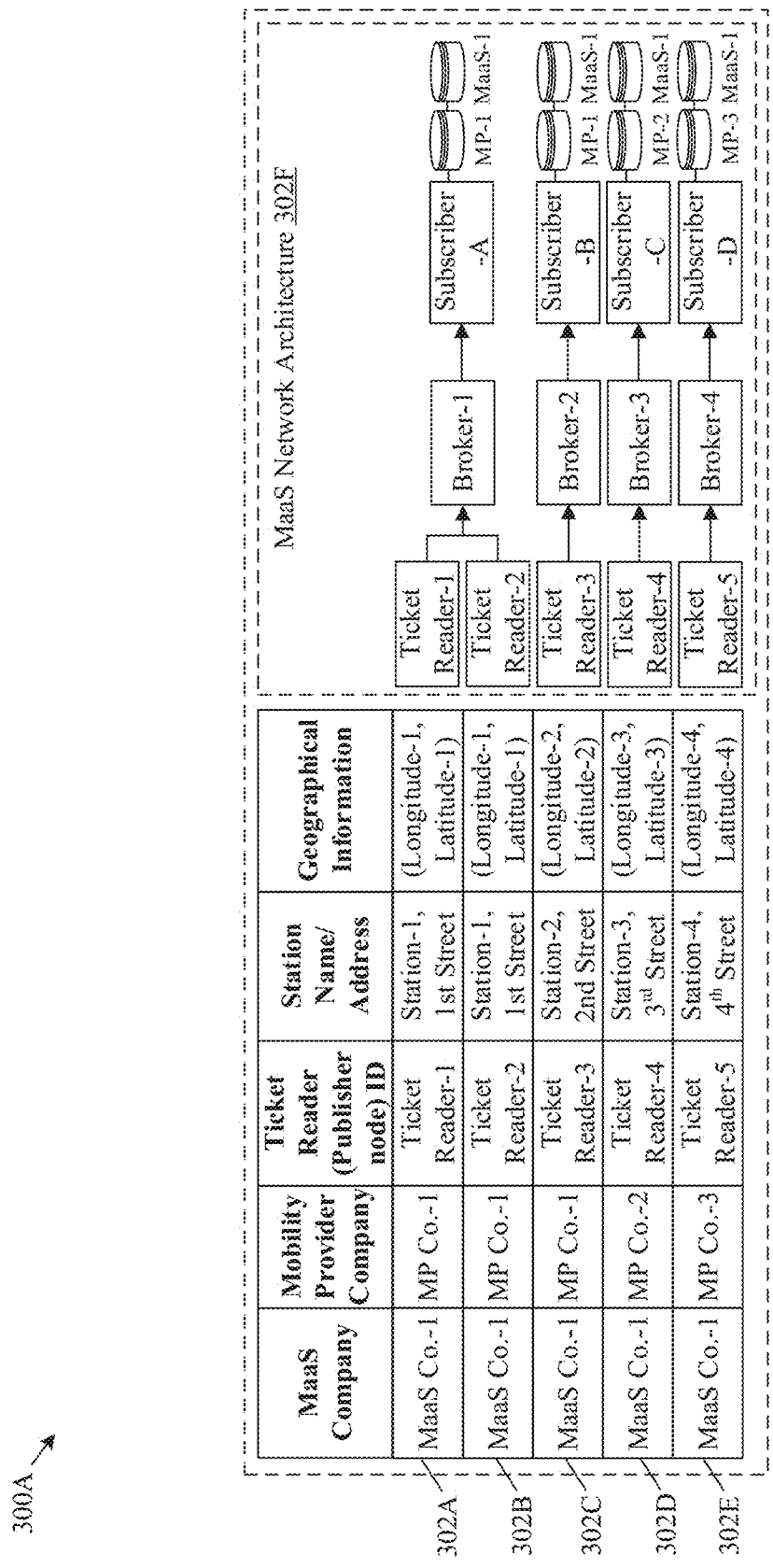
FIG. 3A illustrates an exemplary user interface (UI) for display of master configuration information and an exemplary architecture of a MaaS network, in accordance with an embodiment of the disclosure.

FIG. 3A illustrates an exemplary user interface (UI) for display of master configuration information and an exemplary architecture of a MaaS network, in accordance with an embodiment of the disclosure. FIG. 3A is explained in conjunction with element from FIGS. 1 and 2. With reference to FIG. 3A, there is shown a first UI 300A. The broker node device 106 may be configured to control the IT system 124 to display the first UI 300A for the IT administrator 128. The first UI 300A may include a table for exemplary master configuration information with fields including a MaaS company of a ticket reader (i.e., a publisher node), a mobility provider (MP) company of the ticket reader, a ticket reader identifier (ID) of the ticket reader, station name/address of the ticket reader, and geographical information of the ticket reader. The first UI 300A may further include an exemplary MaaS Network Architecture 302F of a MaaS network (e.g., the first MaaS network) which may be related to the master configuration information.

For example, a row 302A of the first UI 300A may display the master configuration information of a first ticket reader (e.g., a ticket reader with ID "Ticket Reader-1"). The first ticket reader may be installed in a "Station 1" on a "$1^{st}$ street" with geographical information of "(Latitude-1, Longitude-1)". The MaaS company and the MP company of the first ticket reader may be "MaaS Co.-1" and "MP Co.-1", respectively. Further, a row 302B of the first UI 300A may display the master configuration information of a second ticket reader (e.g., a ticket reader with ID "Ticket Reader-2"). The second ticket reader may be installed in the same "Station 1" on the "$1^{st}$ street" with the same geographical information of "(Latitude-1, Longitude-1)". The MaaS company and the MP company of the second ticket reader may be "MaaS Co.-1" and "MP Co.-1", respectively.

In an example, a row 302C of the first UI 300A may display the master configuration information of a third ticket reader (e.g., a ticket reader with ID "Ticket Reader-3"). The third ticket reader may be installed in a "Station 2" on a "$2^{nd}$ street" with geographical information of "(Latitude-2, Longitude-2)". The MaaS company and the MP company of the third ticket reader may be "MaaS Co.-1" and "MP Co.-1", respectively. Furthermore, a row 302D of the first UI 300A may display the master configuration information of a fourth ticket reader (e.g., a ticket reader with ID "Ticket Reader-4"). The fourth ticket reader may be installed in a "Station 3" on a "$3^{rd}$ street" with geographical information of "(Latitude-3, Longitude-3)". The MaaS company and the MP company of the fourth ticket reader may be "MaaS Co.-1" and "MP Co.-2", respectively. In addition, a row 302E of the first UI 300A may display the master configuration information of a fifth ticket reader (e.g., a ticket reader with ID "Ticket Reader-5"). The fifth ticket reader may be installed in a "Station 4" on a "$4^{th}$ street" with geographical information of "(Latitude-4, Longitude-4)". The MaaS company and the MP company of the fifth ticket reader may be "MaaS Co.-1" and "MP Co.-3", respectively.

As shown in the UI 300A, the MaaS Network Architecture 302F may illustrate an association between nodes of a MaaS network (e.g., an association between the first plurality of nodes of the first MaaS network). As shown in FIG. 3A, the "Ticket Reader-1" and the "Ticket Reader-2" publisher nodes may be associated with a "Broker-1" broker node device of the first MaaS network. Further, the "Broker-1" broker node device may be associated with a "Subscriber-A" subscriber node, which may connect with a distributed ledger node of a first mobility provider "MP-1" (e.g., an "MP Co.-1" node) and a distributed ledger node of the MaaS provider "MaaS-1" (e.g., a "MaaS Co.-1" node) of the first MaaS network.

There is further shown in the MaaS Network Architecture 302F of FIG. 3A, the "Ticket Reader-3", the "Ticket Reader-4", and the "Ticket Reader-5" publisher nodes, which may be associated with "Broker-2", "Broker-3", and "Broker-4" broker node devices, respectively, of the first MaaS network. The "Broker-2" broker node device may be associated with a "Subscriber-B" subscriber node, which may connect with a distributed ledger node of the first mobility provider "MP-1" (e.g., an "MP Co.-1" node) and the distributed ledger node of the MaaS provider "MaaS-1" (e.g., a "MaaS Co.-1" node) of the first MaaS network. Further, the "Broker-3" broker node device may be associated with a "Subscriber-C" subscriber node, which may connect with a distributed ledger node of a second mobility provider "MP-2" (e.g., an "MP Co.-2" node) and the distributed ledger node of the MaaS provider "MaaS-1" (e.g., a "MaaS Co.-1" node) of the first MaaS network. Similarly, the "Broker-4" broker node device may be associated with a "Subscriber-D" subscriber node, which may connect with a distributed ledger node of a third mobility provider "MP-3" (e.g., an "MP Co.-3" node) and the distributed ledger node of the MaaS provider "MaaS-1" (e.g., a "MaaS Co.-1" node) of the first MaaS network.

The first UI 300A may present an overview of the first MaaS network, its various nodes, and the master configuration information of the nodes. Further, the first UI 300A may present the architecture of the first MaaS network. This may enable the IT administrator 128 to view and/or take decisions related to modification of the architecture of the first MaaS network to further enhance its throughput.

FIG. 3B illustrates an exemplary UI for display of telemetry information related to transactions on a MaaS network, in accordance with an embodiment of the disclosure. FIG. 3B is explained in conjunction with element from FIGS. 1, 2, and 3A. With reference to FIG. 3B, there is shown a second UI 300B. The broker node device 106 may be configured to control the IT system 124 to display the second UI 300B for the IT administrator 128. The second UI 300B may include a table (as telemetry information) with a plurality of fields, such as, a region name, population in the region, a total number of vehicles in the region, vehicles currently in-use in the region, a transaction volume (for example, in transactions per minute) in the region, and current day's transaction sales (for example, in US Dollars). The plurality of fields may further include a status (for example, a percentage of online nodes) of ticket readers (i.e., publisher nodes) in the region, a status (for example, a percentage of online nodes) of broker node devices, a status (for example, a percentage of online nodes) of subscriber nodes, and a status (for example, a percentage of online nodes) of distributed ledger nodes.

For example, in row 304A, the second UI 300B may display the telemetry information of a region "Region-1", which may have a population of "1,000,000" and a total number of vehicles as "200,000" in the region. Example of a region may include, but is not limited to, a village, a town, a city, a state/province, a country, a group of countries, or a geographical region. As shown in FIG. 3B, the number of vehicles that may be currently in use in the "Region-1" may be "180,000" (i.e., 90% of the total vehicles). For example, the "Region-1" may handle, on an average (or in real-time), "400" transactions per minute, and may generate transaction sales of USD 2,160,000 on a particular current day (i.e., in last 24 hours when the UI may be displayed). Further, the status of the ticket readers of the "Region-1" may indicate that "85%" of the ticket readers of "Region-1" may be online on an average (or in real-time) on the particular day. In addition, the status of the broker nodes devices may indicate that "98%" of broker node devices of the "Region-1" may be online on an average (or in real-time) on the particular day. Further, the status of the subscriber nodes and the status of the distributed ledger nodes of the "Region-1" may indicate that "91%" of the subscriber nodes and "99%" of the distributed ledger nodes may be online on an average (or in real-time) on the particular day. The telemetry information for regions "Region-2", "Region-3", "Region-4", and "Region-5" may be similarly displayed by the second UI 300B in rows 304B, 304C, 304D, and 304E of the second UI 300B, respectively. The second UI 300B may allow the IT administrator 128 to view overall performance (i.e. operational, transaction flow, population, sales, etc.) in different regions of the first MAAS network.

FIG. 3C illustrates an exemplary UI for display of MaaS transaction flow and root causes of transaction failures, in accordance with an embodiment of the disclosure. FIG. 3C is explained in conjunction with element from FIGS. 1, 2, 3A, and 3B. With reference to FIG. 3C, there is shown a third UI 300C. The broker node device 106 may be configured to control the IT system 124 to display the third UI 300C for the IT administrator 128. The third UI 300C may include a table that may include a plurality of fields, such as a transaction correlation ID, a publisher node, a station ID (for e.g., a node of the first server 116), a broker node device (for e.g., the broker node device 106), a subscriber node, a distributed ledger node (such as, a ledger node of the distributed ledger 110), a transaction status, and a root cause of the failure of a transaction associated with the transaction correlation ID. The third UI 300C may display the transaction flow of different transactions between the plurality of nodes of the first MaaS network, the transaction status of the transactions, and the root cause for failure for the transactions.

The third UI 300C may display the routing information which may be associated with a routing of transaction messages through the first plurality of nodes of the first MaaS network. For example, a row 306A of the third UI 300C may display the routing information of a transaction (such as, a first transaction) as the nodes of the first MaaS network that may be traversed by a first transaction message (with correlation ID as "TM01") associated with the first transaction. As per the row 306A, the first transaction message may be routed through the publisher node "G1", the broker node device "V1", the subscriber node "SUB1", and the distributed ledger node "Node 1-1" is defined in the routing information for the first transaction message. The first transaction message associated with the first transaction may include the first correlation ID "TM01". The broker node device 106 may track the first transaction based on the first correlation ID "TM01". In an exemplary scenario, the first transaction with the first correlation ID "TM01" may be transmitted by the publisher node "G1" (such as, the first publisher node 104A) and may be received at the subscriber node "SUB1" (such as, a second node of the first plurality of nodes), via the broker node device "V1". The broker node device 106 may track that the first transaction message that may be transmitted from the first publisher node 104A and received by the subscriber node, may correspond to same first transaction based on the first correlation ID "TM01". As shown in FIG. 3C, the transaction status of the first transaction message may be displayed as "Success" upon successful receipt of the first transaction message by the subscriber node "SUB1". The broker node device 106 may be configured to determine the transaction status based on the receipt of the first notification from the second node (for example the subscriber node "SUB1" or the distributed ledger node "Node 1-1" in the row 306A). The first notification may indicate the receipt of the first transaction message (with the first correlation ID "TM01") at the second node. The determination of the transaction status based on the receipt of the first notification is further described, for example, in FIG. 3F.

In an embodiment, a row 306B of the third UI 300C may display the routing information of a transaction (such as, a second transaction). As per the row 306B, a second transaction message (with a second correlation ID as "TM02") may be routed through the publisher node "G2", the broker node device "V1", the subscriber node "SUB1", and the distributed ledger node "Node 1-1" as defined in the routing information for the second transaction message. The second transaction message associated with the second transaction may include the second correlation ID "TM02". The broker node device 106 may track the second transaction based on the second correlation ID "TM02". In an exemplary scenario, the second transaction with the second correlation ID "TM02" may be transmitted by the publisher node "G2". As shown in the row 306B, the transaction status of the second transaction message may be displayed as "Failure" upon unsuccessful receipt of the second transaction message by the subscriber node "SUB1". The broker node device 106 may be configured to determine the transaction status based on the receipt of the first notification from the second node (for example the subscriber node "SUB1" or the distributed ledger node "Node 1-1" in the row 306B). The first notification may indicate the receipt of the second transaction message (with the second correlation ID "TM02") at the second node. Therefore, based on the received first notification from the second node, the broker node device 106 may determine the transaction status of the second transaction message as "Failure". As further shown in the row 306B, the second transaction may fail due to, for example, a power down at the broker node device "V1". The broker node device 106 may be configured to collect the operation information from a node (for example the broker node device "V1") and determine the operational trouble (such as the power down) at the broker node device "V1". Based on the determined operational trouble of the broker node device "V1, the broker node device 106 may determine the cause for failure of the second transaction (with the second correlation ID "TM02") as "power down at the broker node device" ("V1") as shown in the row 306B. In some embodiments, the broker node device 106 may not receive the first notification from the broker node device ("V1") due to power failure problem. Thus, based on the unsuccessful receipt of the first notification from the broker node device ("V1") and the determined operational trouble of the broker node device ("V1"), the broker node device 106 may determine that the second transaction is failed with the cause for failure as power down at the broker node device ("V1").

In an embodiment, a row 306C of the third UI 300C may display the routing information of a transaction (such as, a third transaction). As per the row 306C, a third transaction message (with a third correlation ID as "TM03") may be routed through the publisher node "G3", the broker node device "V1", the subscriber node "SUB1", and the distributed ledger node "Node 1-1" as defined in the routing information for the third transaction message. The third transaction message associated with the third transaction may include the third correlation ID "TM03". The broker node device 106 may track the third transaction based on the third correlation ID "TM03". In an exemplary scenario, the third transaction with the third correlation ID "TM03" may be transmitted by the publisher node "G3". As shown in the row 306C, the transaction status of the third transaction may be "Failure" and the cause for failure of the third transaction may be, for example, a network connection error at the first server 116 with the station ID "ST001". The transaction status, and the cause for failure for the third transaction may be determined based on the third correlation ID ("TM03"), the first notification received from the second node (for example the first server 116), the operational trouble determined for the second node (for example the first server 116), or the combination.

Similarly, the broker node device 106 may be configured to display, via the third UI 300C, the routing information associated with the plurality of transactions, as shown by a plurality of rows 306A-306J. The broker node device 106 may further display, via the third UI 300C, the transaction status and the cause for failure for the plurality of transactions to allow the IT administrator 128 to easily visualize operational status and the cause for failure for the plurality of transactions (for example a large volume of transactions, like thousands or millions of transactions) handled by the first MaaS network over the period of time. In an embodiment, the third UI 300C may highlight (e.g., enclose in a box to attract attention) a particular node of the plurality of nodes which caused the failure for a particular transaction. For example, for the second transaction (with the second correlation ID "TM02"), the broker node device "V1" is highlighted in the third UI 300C for the IT administrator 128, as the cause for failure of the second transaction is the "Power down at broker node device" as shown in the row 306B). In accordance with an embodiment, the broker node device 106 may receive an input from the IT administrator 128 via the third UI 300C to update the routing information for a particular failed transaction. The broker node device 106 may further transmit the updated routing information to the central routing configuration repository 122A. In another embodiment, the AI engine 130 may provide automatic recommendations, to the IT administrator 128 via the third UI 300C, to update the routing information. The update of the routing information for a particular failed transaction is described, for example, in FIG. 3G.

FIG. 3D illustrates an exemplary UI for display of status of transaction messages on different transaction message routes on a MaaS network, in accordance with an embodiment of the disclosure. FIG. 3D is explained in conjunction with element from FIGS. 1, 2, 3A, 3B, and 3C. With reference to FIG. 3D, there is shown a fourth UI 300D. The broker node device 106 may be configured to control the IT system 124 to display the fourth UI 300D for the IT administrator 128. The fourth UI 300D may include a table that may include a plurality of fields, such as, transaction correlation IDs of transaction messages, ticket readers (i.e., publisher nodes), broker node devices, subscriber nodes, distributed ledger nodes associated with mobility providers (MPs), distributed ledger nodes associated with MaaS player of a MaaS network (e.g., the first MaaS Network). The plurality of fields of the table of the fourth UI 300D may further include actual number of transactions (per unit time, for example, per minute) on the transaction message route, average number of transactions (per unit time, for example, per minute) on the transaction message route, a transaction status, and an alert category to be provided to the IT administrator 128.

For example, in row 308A, there is shown a first transaction message with a transaction correlation ID (e.g., "TM01"), which may be generated at a ticket reader (e.g., "RDR-1"). The first transaction message "TM01" may traverse a first route on the MaaS network including nodes such as, the ticket reader "RDR-1", a broker node device (e.g., "BRK-A"), a subscriber node (e.g., "SUB-C"), a distributed ledger node of an MP (e.g., "BC-MP-A"), and finally a distributed ledger node (e.g., "BC-MA-C") of the MaaS player of the MaaS network (e.g., the first MaaS network). The actual number of transactions on the first route may be "41", while the average number of transactions on the first route may be "50" which may be normally received, say per minute. In an example, as the actual number of transactions is less than the average number of transactions on the first route (and not equal to zero, which may indicate operational trouble), the transaction status of the first transaction message "TM01" may be "Normal". In such case, an alert category associated with the first transaction message "TM01" and with the transaction message route may be "Green" for the IT administrator 128 as shown in the fourth UI 300D. In an example, "Green color" category may be assigned to transactions with "Normal" transaction status.

In rows 308B and 308C, a second transaction message (e.g., with a transaction correlation ID "TM02") and a third transaction message (e.g., with a transaction correlation ID "TM03") may be generated at ticket readers "RDR-2" and "RDR-3", respectively. As shown in row 308B, the second transaction message "TM02" may traverse a second route including nodes such as, "RDR-2", "BRK-A", "SUB-D", "BC-MP-B1", and "BC-MA-D". Similarly, as shown in row 308C, the third transaction message "TM03" may traverse a third route including nodes such as, "RDR-3", "BRK-A", "SUB-E", "BC-MP-B2", and "BC-MA-D". Actual number of transactions on both the second route and the third route may be "0", while the average number of transactions on the second route may be "30" and on the third route may be "20". In an example, zero transactions on a route may indicate an operational trouble on the route. Thus, in such case, as shown in rows 308B and 308C, the transaction status of the second transaction "TM02" and the third transaction "TM03" may be "Trouble". In such case, an alert category associated with both the second transaction "TM02" and the third transaction "TM03" (and related routes) may be "Red" for the IT administrator 128 as shown in the fourth UI 300D. In an example, "Red color" category may be assigned to transactions with "Trouble" transaction status.

In rows 308D and 308E, a fourth transaction message (e.g., with a transaction correlation ID "TM04") and a fifth transaction message (e.g., with a transaction correlation ID "TM05") may be generated at ticket readers "RDR-6" and "RDR-7", respectively. As shown in row 308D, the fourth transaction message "TM04" may traverse a fourth route including nodes such as, "RDR-6", "BRK-B", "SUB-F", "BC-MP-C1", and "BC-MA-E". Similarly, as shown in row 308E, the fifth transaction message "TM05" may traverse a fifth route including nodes such as, "RDR-7", "BRK-C", "SUB-G", "BC-MP-C2", and "BC-MA-E". Actual number of transactions on both the fourth route and the fifth route may be "50" and "45", respectively, while the average number of transactions on the fourth route may be "30" and on the fifth route may be "20". In an example, if the actual number of transactions on a route is greater than the average number of transactions on the route, the route may experience an over capacity or jam. Thus, in such case, as shown in rows 308D and 308E, the transaction status of the fourth transaction "TM04" and the fifth transaction "TM05" may be "Jam (Over capacity)". In such case, an alert category associated with both the fourth transaction "TM04" and the fifth transaction "TM05" (and related routes) may be "Yellow". for the IT administrator 128 as shown in the fourth UI 300D In an example, "Yellow color" category may be assigned to transactions with "Jam (Over capacity)" transaction status.

The fourth UI 300D may display transaction messages, routes traversed by the transaction messages through the nodes of the MaaS network (e.g., the first MaaS network), transaction statistics information, and transaction status data, as described in the aforementioned. In an embodiment, information of the transaction messages displayed in the fourth UI 300D may be captured within a certain time interval or include a count of transaction messages that may be either pre-defined or user-configurable. For example, the fourth UI 300D may display information related to the previous 100 transaction messages (or any other number of transactions that may be configured by the IT administrator 128). In another example, the fourth UI 300D may display information related to the transaction messages that may be generated in the past 2 minutes (or any other time interval or that may be configured by IT administrator 128).

FIG. 3E illustrates an exemplary UI for display of predicted future impact of operational troubles on an operation of a MaaS network, in accordance with an embodiment of the disclosure. FIG. 3E is explained in conjunction with element from FIGS. 1, 2, 3A, 3B, 3C, and 3D. With reference to FIG. 3E, there is shown a fifth UI 300E. The broker node device 106 may be configured to control the IT system 124 to display the fifth UI 300E for the IT administrator 128. The fifth UI 300E may include a table that may include a plurality of fields, such as, a region name, an operational trouble that may be experienced in the region, a root cause of the operational trouble, and a predicted future impact on operations of a MaaS network (e.g., the first MaaS network). In an embodiment, the AI engine 130 may determine the predicted future impact based on the operational trouble and the root cause of the operational trouble (or cause of failure of transaction). The AI engine 130 may control the display device of the IT system 124 to display the determined predicted future impact in the fifth UI 300E. In an embodiment, the AI engine 130 may use time series information or historical information associated with the first MaaS network, for the classification of operation trouble events into predicted future impact. The time series information or historical information may include tags associated with the operational trouble events, such as, location, mobility provider company, MaaS company, IT equipment. The tags may be associated with the classification of the operation trouble events. The AI engine 130 may use the tags for training of the AI engine 130 to generate the recommendations and determine the predicted future impact based on the classification of operation trouble events.

In an example, the fifth UI 300E may display information related to the predicted future impact on operations of the first MaaS network in regions such as, but not limited to, a "Region-1" (in row 310A), a "Region-2" (in row 310B), a "Region-3" (in row 310C), a "Region-4" (in row 310D), a "Region-5" (in row 310E), a "Region-6" (in row 310F), and a "Region-7" (in row 310G). In the row 310A, there is shown that there may be an operational trouble of a "Shut down of 25% of station gates" (e.g., of a metro or train service) in the "Region-1" due to a root cause of an "Earthquake of magnitude of 5 on Richter scale". In such case, the AI engine 130 may predict that the future impact on operation of the first MaaS network in the "Region-1" may be a "Non-availability of metro services for the next 3 hours" in the "Region-1". In the row 310B, there is shown that there is "Traffic stoppages due to curfew" in the "Region-2" due to a "pandemic/epidemic", as example. The AI engine 130 may predict that the future impact on the operations of the first MaaS network may be "Non-availability of cab services on weekends and between 7 PM to 7 AM on weekdays". Similarly, for example, the fifth UI 300E may display the predicted future impacts of different operational troubles on operations of the first MaaS network in the other regions (i.e., the Region-3, Region-4, Region-5, Region-6, and Region-7) in rows 310C to 310G, respectively.

FIG. 3F illustrates an exemplary UI for display of transaction message log and root cause determination, in accordance with an embodiment of the disclosure. FIG. 3F is explained in conjunction with element from FIGS. 1, 2, 3A, 3B, 3C, 3D, and 3E. With reference to FIG. 3F, there is shown a sixth UI 300F. The sixth UI 300F may be another example of UI (i.e. different from the third UI 300C) that may be displayed for the IT administrator 128. The broker node device 106 may be configured to control the IT system 124 to display the sixth UI 300F for the IT administrator 128. The sixth UI 300F may indicate a table which may include a plurality of fields, such as:
1. A publisher node field that may depict a correlation ID and a timestamp associated with a transaction initiated by the publisher node,
2. A broker node device field that may depict a correlation ID and a timestamp of transaction messages and notifications,
3. A subscriber node field that may depict a correlation ID and a timestamp of received transaction messages,
4. A transaction status, and
5. A root cause of failure of a transaction.

As shown in FIG. 3F, for example, a row 312A of the sixth UI 300F may depict that the first transaction message with the first correlation ID "TM01" may be transmitted from the publisher node "P1" and may have a transmission timestamp of "11:23:11 hours on Jan. 1, 2020". The first transaction message (with the first correlation ID "TM01") may be received by a broker node device "B1" (such as the broker node device 106) from the publisher node "P1" at a timestamp "11:23:55 hours on Jan. 1, 2020". Further, as shown in the row 312A, the first transaction message (with the first correlation ID "TM01") may be received by a subscriber node "S1" at a timestamp "11:24:03 hours on Jan. 1, 2020" from the broker node device "B1". Further, as shown in the row 312A, the broker node device "B1" may receive the first notification of a receipt of the first transaction message (with the first correlation ID "TM01") at the subscriber node "S1" at a timestamp "11:25:30 hours on Jan. 1, 2020", where the first notification may be received from the subscriber node "S1". Based on the receipt of the first notification from the subscriber node "S1" and analysis of the first correlation ID "TM01" in the first transaction message, the broker node device "B1" may determine that the transaction status of the first transaction as "successful". In some embodiments, the broker node device 106 (or broker node device "B1") may be configured to match the first correlation ID "TM01" in the first transaction message received from the publisher node "P1" and the first notification received from the subscriber node "S1" to determine the transaction status of the first transaction as "Success" as shown in the row 312A of the sixth UI 300F.

Similarly, a row 312B of the sixth UI 300F may depict the second transaction message with the second correlation ID "TM02" that may be transmitted from the publisher node "P2" and may have a transmission timestamp of "12:20:04 hours on Jan. 1, 2020". The second transaction message (with the second correlation ID "TM02") may be received by the broker node device "B1" (such as, the broker node device 106) from the publisher node "P2" at a timestamp "12:22:02 hours on Jan. 1, 2020". For example, as shown in the row 312B, the subscriber node "S2" may have a status as "operationally troubled" due to an operational failure of the subscriber node "S2". In such case, the broker node device "B1" may not receive the first notification from the subscriber node "S2" and may further determine the operational trouble of the subscriber node "S2" based on the collected or received operation information about the subscriber node "S2". Therefore, the broker node device "B1" may indicate the status corresponding to the subscriber node "S2" as "operationally down" as shown in the row 312B. The broker node device "B1" may further determine the cause of the failure of the subscriber node "S2", for example, as a "message handling capacity overload" at the subscriber node "S2" based on the received operation information about the subscriber node "S2". In some embodiments, the broker node device "B1" may receive the operation information about the subscriber node "S2" based on the non-receipt of the first notification from the subscriber node "S2" and/or unmatched second correlation ID "TM02" to determine the cause for failure for the second transaction. In an embodiment, the broker node device "B1" may provide a link (e.g., "Click here"), via the sixth UI 300F to a user (such as the IT administrator 128) to diagnose and/or rectify a problem associated with the operationally troubled subscriber node "S2" and provide a solution to the problem. The broker node device 106 may be configured to receive the user input, via the sixth UI 300F, from the IT administrator 128 (i.e. who may activate "Click here") to initiate the diagnose and/or the rectification of the problem associated with the operationally troubled subscriber node "S2".

Though, a value of a difference between timestamps of transmission transaction message by a publisher node and reception of transaction message by a broker node device (or subscriber node) is shown to be between 2-3 minutes in FIG. 3F, the disclosure may not be so limited. In certain embodiments, the value of the difference may be lesser than 2-3 minutes (for example in certain seconds or milliseconds) or greater than minutes difference shown in FIG. 3F, without departure from the scope of the disclosure.

Figure 3G:
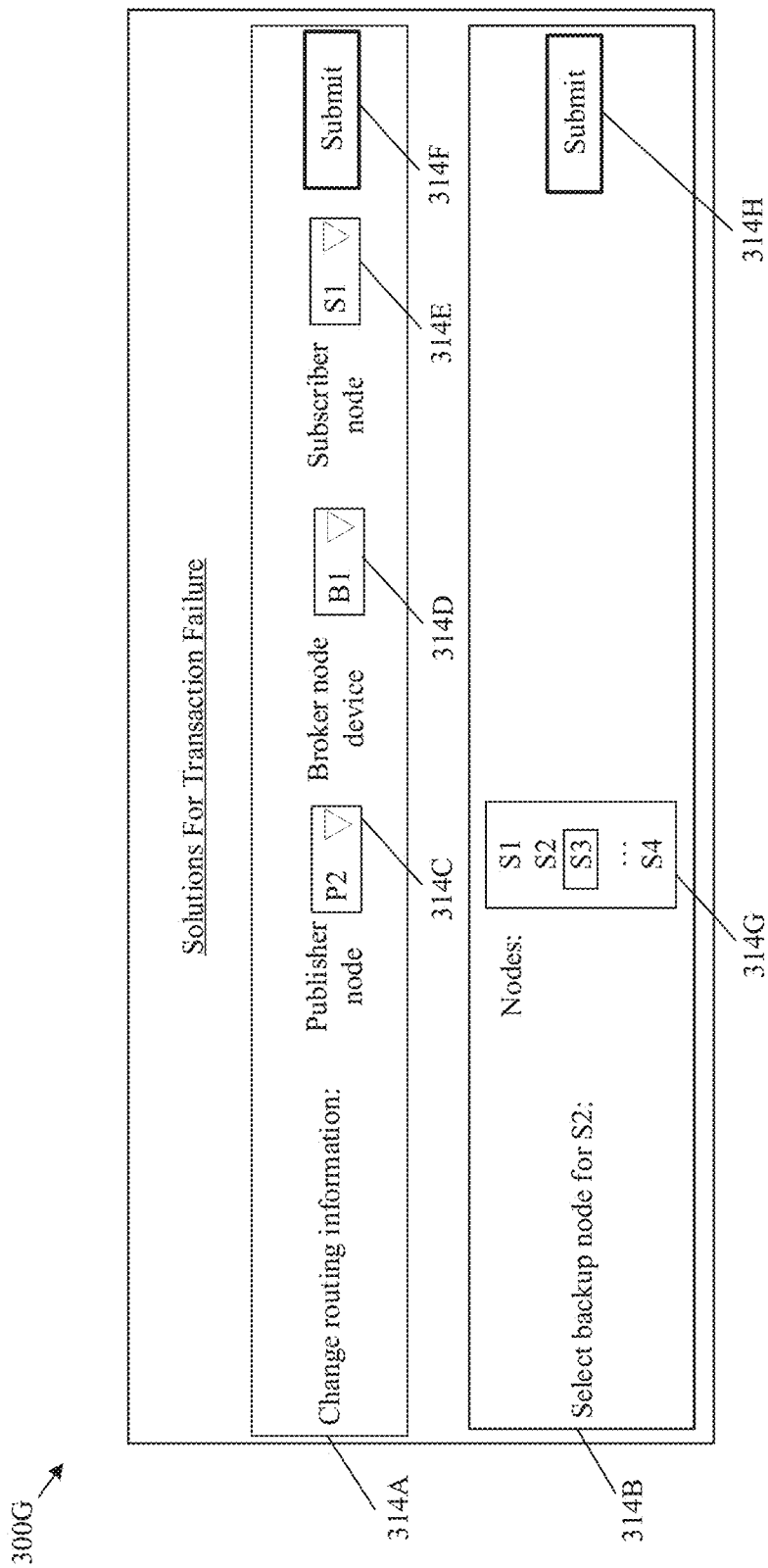
FIG. 3G illustrates an exemplary UI for configuration of solutions for the rectification of operational troubles of one or more nodes of a MaaS network, in accordance with an embodiment of the disclosure.

FIG. 3G illustrates an exemplary UI for configuration of solutions for rectification of operational troubles of one or more nodes of a MaaS network, in accordance with an embodiment of the disclosure. FIG. 3G is explained in conjunction with element from FIGS. 1, 2, 3A, 3B, 3C, 3D, 3E, and 3F. With reference to FIG. 3G, there is shown a seventh UI 300G. The broker node device 106 may be configured to control the IT system 124 to display the seventh UI 300G for the IT administrator 128. The seventh UI 300G may include UI options for the user (i.e. IT administrator 128) to select solutions for rectification of the failure of a transaction (such as the first transaction) in the first MaaS network. The broker node device 106 may control the display device to display on the seventh UI 300G, a first UI field 314A corresponding to a change in the routing information of the first transaction. For example, the broker node device 106 may detect the operational trouble of any node of the first plurality of nodes. The broker node device 106 may receive the user input or may allow the user (i.e. IT administrator 128) to select another node that may be included in the route of transaction of the first transaction message. Based on the selection of the other node in the route of transaction, the routing information for the first transaction message (i.e. originated from a particular publisher node) may be updated. In an exemplary embodiment, a first drop-down menu 314C may be displayed to the user in the first UI field 314A, for the selection of a publisher node from the plurality of publisher nodes 104A-104N. Further, a second drop-down menu 314D may be displayed to the user in the first UI field 314A, for the selection of a subscriber node of the plurality of subscriber nodes 108A-108N. Similarly, a third drop-down menu 314E may be displayed to the user in the first UI field 314A, for the selection of another broker node device in the first MaaS network. Further, a submit button 314F may be displayed in the first UI field 314A, which on being clicked or pressed by the user (i.e. the IT administrator 128) may initiate a transmission of the updated routing information (as per the selected publisher node, the subscriber node, and/or the broker node device) to the central routing configuration repository 122A.

Moreover, the broker node device 106 may further control the display device to display on the seventh UI 300G, a second UI field 314B corresponding to a selection of the backup node or an alternate node for the transaction of the first transaction message in the first MaaS network. For example, the second UI field 314B may present a drop-down menu 314G including options for the user (i.e. the IT administrator 128) to select a subscriber node (e.g., "S3") as the backup node for a subscriber node "S1" which may have the operation trouble. The second UI field 314B may also include, for example, a submit button 314H to initiate a transmission of the information (i.e. about the user-selected subscriber backup node) to the broker node device 106 when the submit button 314H is pressed or clicked by the user. In an embodiment, the broker node device 106 may receive, via the second UI field 314B of the seventh UI 300G, an input associated with the selection of the backup node or the alternate node for the operationally troubled node from the first plurality of nodes. Based on the received input, the broker node device 106 may further initiate, via the node management device 118 associated with the broker node device 106, the selection of the backup node or the alternate node for the operationally troubled node. Thus, the broker node device 106 may control the IT system 124 (or the associated display device) to display the cause of failures of unsuccessful transactions through the first UI 300A to the IT administrator 128 and further enable the IT administrator 128 to provide a solution to the failures and also improve transaction throughput of the first MaaS network through the seventh UI 300G. For example, through the seventh UI 300G, the IT system 124 may receive the input from the IT administrator 128, to manage the routing information and configuration associated with the nodes and also to backup or restore operationally troubled nodes of the first MaaS network. Therefore, the disclosed broker node device 106 may provide a UI based management of mobility transaction management for MaaS networks.

In an embodiment, the AI engine 130 may be configured to determine recommendations associated with the rectification of the operational troubles and/or transaction failures. The AI engine 130 may control the display device of the IT system 124 to display the determined recommendation. For example, the seventh UI 300G may also display such recommendations on the IT system 124 for the IT administrator 128. Examples of the recommendations may include, but are not limited to, information about alternate routes, information about backup nodes for failed transactions, or UI options to switch between nodes/routes of different mobility providers. To provide the recommendations, the AI engine 130 may use time series information or historical information associated with the first MaaS network for the classification of operation trouble events. The time series information or historical information may include the tags associated with the operational trouble events, such as, location, mobility provider company, MaaS company, IT equipment. In an embodiment, the broker node device 106 may resolve the operational trouble and transaction failure based on a command received from the AI engine 130 by use of an optimum recommendation auto-selected by the AI engine 130. This may rectify the operational troubles and/or the transaction failure automatically in a timely manner in an event where the IT administrator 128 may be unable to manually select a recommendation or provide a user input to rectify the operational trouble or transaction failure.

Figure 3H:
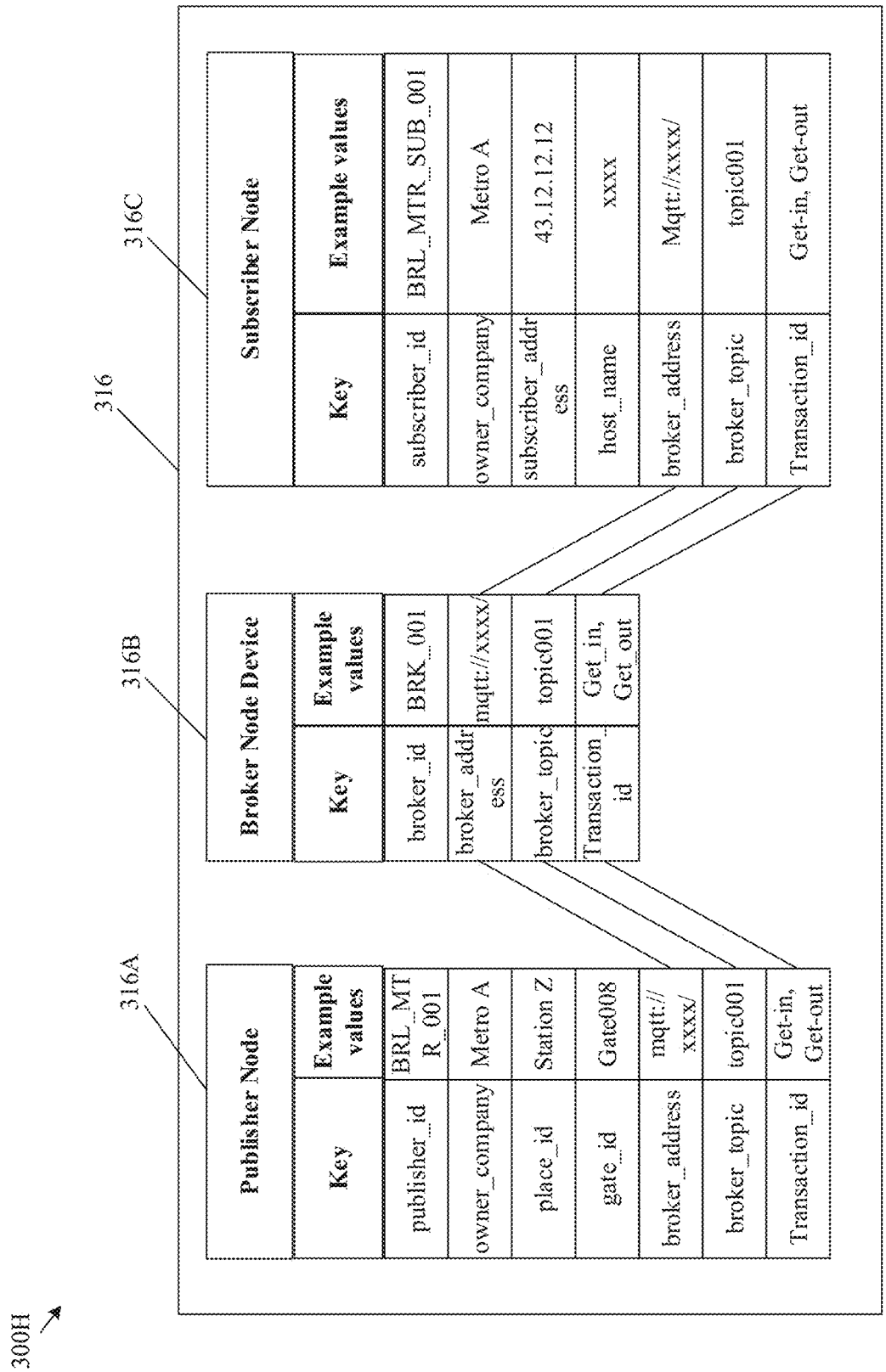
FIG. 3H illustrates an exemplary UI for display of routing information associated with a publisher node, a broker node device, and a subscriber node of a MaaS network, in accordance with an embodiment of the disclosure.

FIG. 3H illustrates an exemplary UI for display of routing information associated with a publisher node, a broker node device, and a subscriber node of a MaaS network, in accordance with an embodiment of the disclosure. FIG. 3H is explained in conjunction with element from FIGS. 1, 2, 3A, 3B, 3C, 3D, 3E, 3F, and 3G. With reference to FIG. 3H, there is shown an eighth UI 300H. The broker node device 106 may be configured to control the IT system 124 to display the eighth UI 300H for the IT administrator 128. The eighth UI 300H may include tables associated with the routing information (such as routing information 316) stored on the central routing configuration repository 122A. The routing information 316 may include a first table 316A associated with a publisher node, a second table 316B associated with a broker node device (e.g., the broker node device 106), and a third table 316C associated with a subscriber node. The first table 316A may include fields (or keys) such as, publisher_id, owner_company, place_id, gate_id, broker_address, broker_topic, and Transaction id. In an example, a publisher node may have a publisher_id as "BRL_MTR_001", owner_company as "Metro A", place_id as "Station Z", gate_id as "Gate008", broker_address as "mqtt://xxxx/", broker_topic as "topic001", and Transaction_id as "Get-in, Get-out" as shown in the eighth UI 300H. The second table 316B may include fields (or keys) such as, broker_id, broker_address, broker_topic, and Transaction_id. In an example, a broker node device may have a broker_id as "BRK001", broker_address as "mqtt://xxxx/", broker_topic as "topic001", and Transaction_id as "Get-in, Get-out" as shown in the eighth UI 300H. The third table 316C may include fields (or keys) such as, subscriber_id, owner_company, subscriber_address, host_name, broker address, broker_topic, and Transaction_id. In an example, a subscriber node may have a subscriber_id as "BRL_MTR_SUB_001", owner_company as "Metro A", subscriber_address as "43.12.12.12", host_name as "xxxx", broker_address as "mqtt://xxxx/", broker_topic as "topic001", and Transaction_id as "Get-in, Get-out" as shown in the eighth UI 300H. The first table 316A, the second table 316B, and the third table 316C may be associated with each other with a relationship based on common fields such as, broker_address, broker_topic and Transaction id. In an embodiment, the broker node device 106 may be configured to consider the common fields of the first table 316A, the second table 316B, and the third table 316C to determine the routing information to route the transactions between the publisher node (for example the first publisher node 104A) and the subscriber node (for example the first subscriber node 108A), via the broker node device 106. In an embodiment, the broker node device 106 may be configured to determine the cause for failure of the first transaction based on the routing information, and the at least one of the first correlation ID in the first transaction message, the received first notification, and the determined operational trouble.

Figure 3I:
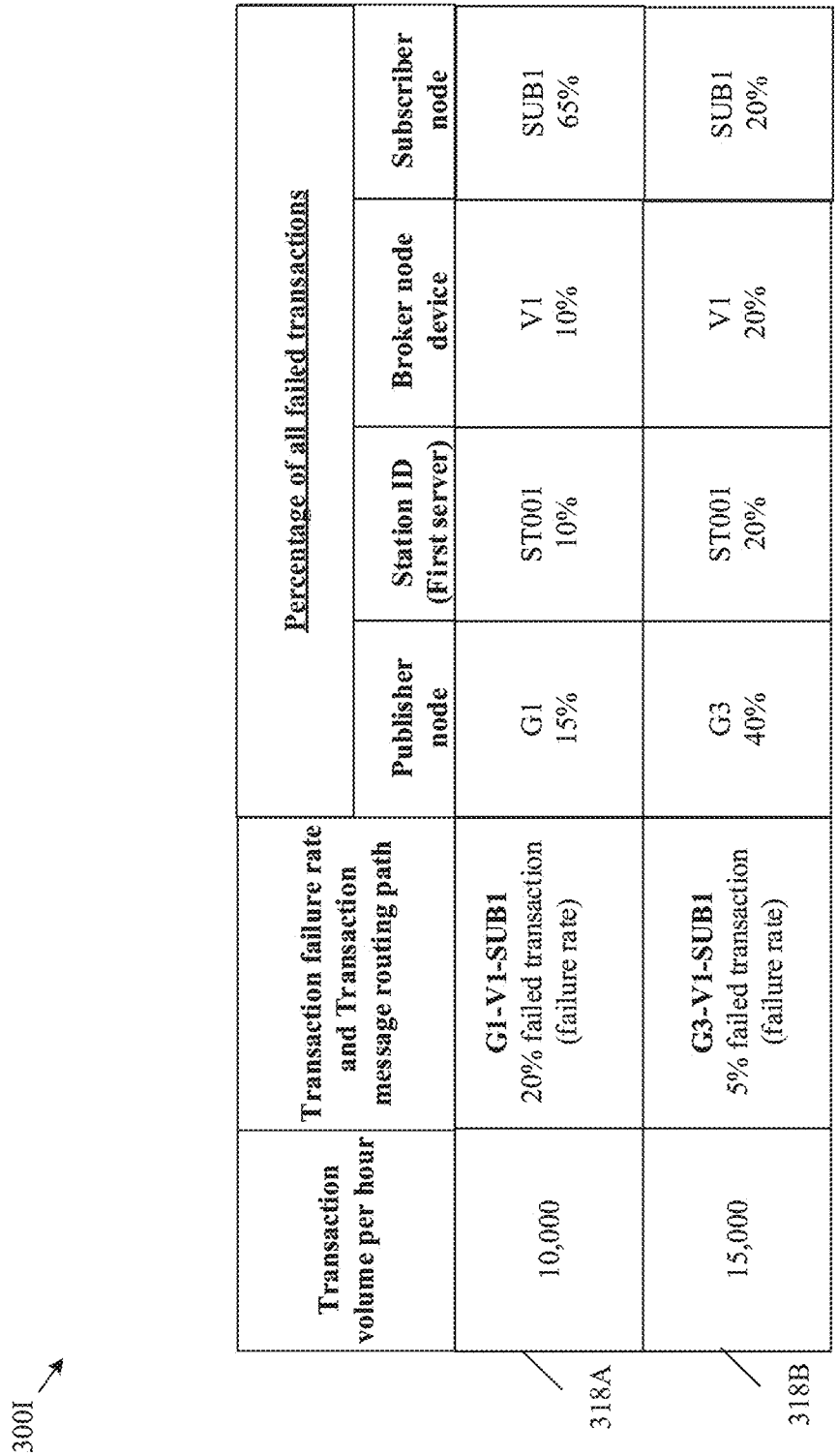
FIG. 3I illustrates an exemplary UI for display of transaction failure statistics across transaction message routes in a MaaS network, in accordance with an embodiment of the disclosure.

FIG. 3I illustrates an exemplary UI for display of transaction failure statistics across transaction message routes in a MaaS network, in accordance with an embodiment of the disclosure. FIG. 3I is explained in conjunction with element from FIGS. 1, 2, 3A, 3B, 3C, 3D, 3E, 3F, 3G, and 3H. With reference to FIG. 3I, there is shown a ninth UI 300I. The broker node device 106 may be configured to control the IT system 124 to display the ninth UI 300I for the IT administrator 128. The ninth UI 300I may indicate a table that may include fields corresponding to transaction volume per hour, transaction failure rate and a percentage of all failed transactions. The transaction volume per hour may indicate a number of transaction messages that may be created per hour in the first MaaS network. The determination of the cause of failure of the transaction messages by the broker node device 106 may allow management of a large transaction volume (for example millions of transactions in a particular time period) in an efficient manner.

The transaction failure rate may depict a rate of failure of transactions on particular routes taken by the transaction messages of the transactions. As shown in the ninth UI 300I, for example, a row 318A depicts the transaction volume per hour as "10,000" on a route "G1-V1-SUB1" (where "G1" may be a publisher node, "V1" may be a broker node device (e.g., the broker node device 106), and "SUB1" may be a subscriber node). The transaction failure rate on the route "G1-V1-SUB1" may be, for example, 20%. Further, the broker node device 106 may be further configured to control the display of an individual percentage of the failure of each node on a particular route. For example, the percentage of failed transactions due to a failure at the publisher node "G1" may be 15%, the percentage of failed transactions due to a failure at the broker node device "V1" may be 10%, and the percentage of failed transactions due to a failure at the subscriber node "SUB1" may be "65%", as shown in the ninth UI 300I. Similarly, a row 318B in the ninth UI 300I depicts the transaction volume per hour as "15,000" on a route "G3-V1-SUB1". The transaction failure rate on the route "G3-V1-SUB1" may be for example, 5%. Thus, the broker node device 106 may allow the IT administrator 128 to view (via the ninth UI 300I) the overall transaction failure status of a particular route in the first MaaS network, such that the IT administrator 128 may gauge a broad-level view of the particular route. In some embodiments, the broker node device 106 may allow the IT administrator 128 to select a route for the transactions having a lower failure rate. In an exemplary scenario, the route "G3-V1-SUB1" may be selected over the route "G1-V1-SUB1" for future routing of transactions in the first MaaS network. In some embodiments, the broker node device 106 may allow the IT administrator 128 to select the particular route (say with higher transaction failure rate) to update the routing information, as described, for example, in FIG. 3G.

FIG. 3J illustrates an exemplary UI for display of transaction failure statistics across mobility providers of a MaaS network, in accordance with an embodiment of the disclosure. FIG. 3J is explained in conjunction with element from FIGS. 1, 2, 3A, 3B, 3C, 3D, 3E, 3F, 3G, 3H, and 3I. With reference to FIG. 3J, there is shown a tenth UI 300J. The broker node device 106 may be configured to control the IT system 124 to display the tenth UI 300J for the IT administrator 128. The tenth UI 300J may depict transaction failure statistics by a plurality of mobility providers on the first MaaS network. The tenth UI 300J may display a success rate and a failure rate of the transaction related mobility providers. The tenth UI 300J may further provide links to view failure types (i.e. operational trouble), transaction messages, and solutions for the failure of the transaction messages as described, for example, FIGS. 3C, 3F, and 3G.

In an exemplary embodiment, the tenth UI 300J may depict the transaction failure statistics associated with a mobility provider "MP1" at a row 320A, a mobility provider "MP2" at a row 320B and a mobility provider "MP3" at a row 320C. For example, the row 320A may depict the success rate of the mobility provider "MP1" as "65%" and the failure rate as "35%". Similarly, the row 320B may depict the success rate of the mobility provider "MP2" as "80%" and the failure rate as "20%", whereas the row 320C may depict the success rate of the mobility provider "MP3" as "75%" and the failure rate as "25%".

The broker node device 106 may further be configured to receive, via the tenth UI 300J, an input from the IT administrator 128 to view the transaction failure information (such as the failure types or the cause for failure) associated with the one or more nodes of the first MaaS network. For example, the broker node device 106 may control the display device to depict in the tenth UI 300J a link (such as "Click here") to display the transaction failure information (e.g., the failure types) associated with the transaction of the particular mobility provider. The selection of the link "Click here" by allow the IT administrator 128 to view the failure types (or the operational trouble) or the cause for failures shown in the third UI 300C in FIG. 3C. For example, the tenth UI 300J may further depict a link (depicted as "Click here") to view the transaction messages of the mobility provider. The selection of such link may redirect the IT administrator 128 to the sixth UI 300F. Moreover, the tenth UI 300J may further depict a link (depicted as "Click here") for the solutions to the failures associated with the mobility provider. The selection of such a link may redirect the user to the seventh UI 300G to explore the solutions (such as update the routing information) for the transactions related to the particular mobility provider.

FIG. 3K illustrates an exemplary UI for display of recovery time for an operationally troubled node of a MaaS network, in accordance with an embodiment of the disclosure. FIG. 3K is explained in conjunction with element from FIGS. 1, 2, 3A, 3B, 3C, 3D, 3E, 3F, 3G, 3H, 3I, and 3J. With reference to FIG. 3K, there is shown an eleventh UI 300K. The broker node device 106 may be configured to control the IT system 124 to display the eleventh UI 300K for the IT administrator 128. The eleventh UI 300K may indicate a table that may depict a recovery time of an operationally troubled node in the first MaaS network. In accordance with an embodiment, the broker node device 106 may be configured to determine the cause for failure (as shown at row 322A) for each of the plurality of transactions associated with the one or more nodes of the first MaaS network. The broker node device 106 may control the display device to display the determined cause for failure for each of the plurality of transactions associated with the one or more nodes.

In some embodiments, the broker node device 106 may further determine the recovery time associated with the operationally troubled node of the one or more nodes, based on the determined cause for failure for each of the plurality of transactions associated with the one or more nodes, and further control the display device to display (as shown at row 322B) the recovery time associated with the operationally troubled node from the one or more nodes. For example, the broker node device 106 may control the display (via the eleventh UI 300K) that the subscriber node "S1" may be operationally down at a timestamp "11:30:00 on Jan. 1, 2020" due to an application error (i.e. operational trouble). Further, the broker node device 106 may receive the first notification for a receipt of a transaction message "TM02" at a timestamp "11:32:25 on Jan. 1, 2020" at the subscriber node "S1" as shown in the eleventh UI 300K. Thus, the broker node device 106 may determine that, earlier the subscriber node "S1 may be operationally down (i.e. determined based on the operation information collected about the subscriber node "S1) and later the subscriber node "S1 may have recovered (i.e. determined based on the receipt of the first notification from the subscriber node "S1 at timestamp "11:32:25 on Jan. 1, 2020"). The broker node device 106 may further configured to determine a recovery time of the subscriber node "S1" based on a difference between the timestamps (as "2 minutes 25 seconds") as shown in the eleventh UI 300K. In accordance with an embodiment, the broker node device 106 may determine a wake up time (i.e., the recovery time) for a certain node, based on the determined operational trouble for that node of the first MaaS network.

Advantageously the disclosed system including the broker node device 106 may support the IT administrator 128 of different mobility providers of the first MaaS network. Further, the disclosed broker node device 106 may perform a root cause analysis (or an impact analysis) of the failures of the transactions of the first MaaS network, and may further control the display of the results of the analysis for the IT administrator 128 of the first MaaS network through a UI (i.e. the UIs depicted in FIGS. 3A-3K as example, without any deviation from scope of the disclosure) of the IT system 124.

The broker node device 106 may further provide trigger notifications based on each network and the publisher-broker-subscriber configuration selected by user (i.e. the IT administrator 128). For example, based on a user-input from the IT administrator 128, the broker node device 106 may provide the trigger notifications through the UI in case of a failure of transactions due to a failure of certain nodes selected by the IT administrator 128. In an example, the IT administrator 128 may select, via the UI, a group of publisher nodes and certain subscriber nodes of a certain mobility provider to receive the trigger notifications from the broker node device 106, in case of failure of one or more transactions due to failure of the selected nodes. The UI may also provide a root cause associated with the failure of each such transaction for impact analysis of the failure of the nodes. In certain scenarios, the IT system 124 may receive, from the IT administrator 128, a user-input indicative of a selection of certain routing paths including certain publisher nodes, broker node devices, and subscriber node devices of the first MaaS network. The broker node device 106 may generate a trigger notification for the IT administrator 128 and may display the trigger notification through the UI of the IT system 124, in case of a failure of one or more transactions on the selected routing paths of the first MaaS network. In response to the trigger notifications, the IT system 124 may receive, from the IT administrator 128 and through the UI, a selection of an alternate routing path for a certain user or type of user (e.g., an economy class user or a business/premium class user) of the first MaaS network, based on preferences or user profiles of the user or types of users.

Moreover, the broker node device 106 may also continuously track a status of the ledger nodes of the distributed ledger 110 and display the tracked status in the UI. Examples of the statuses of the ledger nodes may include, but are not limited to, a normal (or online) state, an aggregator state, or an archival state. In the normal state, a ledger node may be online and may process transaction data that the ledger node may receive from an associated subscriber node. In the aggregator state, a ledger node may transmit transaction data older than a certain first storage time threshold to an aggregator ledger node associated with the distributed ledger 110. In the archival state, the aggregator ledger node associated with the distributed ledger 110 may transmit transaction data older a certain second storage time threshold (greater than the first storage time threshold) to an archival ledger node associated with the aggregator node for archival.

In an embodiment, the broker node device 106 may track the operation information and determine the operational trouble of various sub-nodes of the first MaaS network, and further control the display of the tracked operation information and information related to the determined operational trouble in a UI of the IT system 124 for the impact analysis. For example, the broker node device 106 may track an operational status of the first server 116 and control the display of the tracked operational status of the first server 116 through the UI of the IT system 124 for analysis. The broker node device 106 may also determine the operational trouble of the first server 116 (e.g., an inactive status of the first server 116 due to a network connectivity issue, due to a power failure, or software/hardware malfunction of the first server 116) or any other node, and further control the display of the determined operational trouble of the first server 116 or other nodes of the plurality of nodes. The broker node device 106 may further assist the IT administrator 128 (for example, based on the solutions provided in FIG. 3G) to take corrective action to restore the first server 116 or other nodes in a timely manner to avoid further transaction failures.

The UIs 300A to 300K described in FIGS. 3A-3K are for exemplary purposes and should not be construed to limit the scope of the disclosure. The disclosure may be implemented through various other UIs, without departure from the scope of the disclosure.

Figure 4:
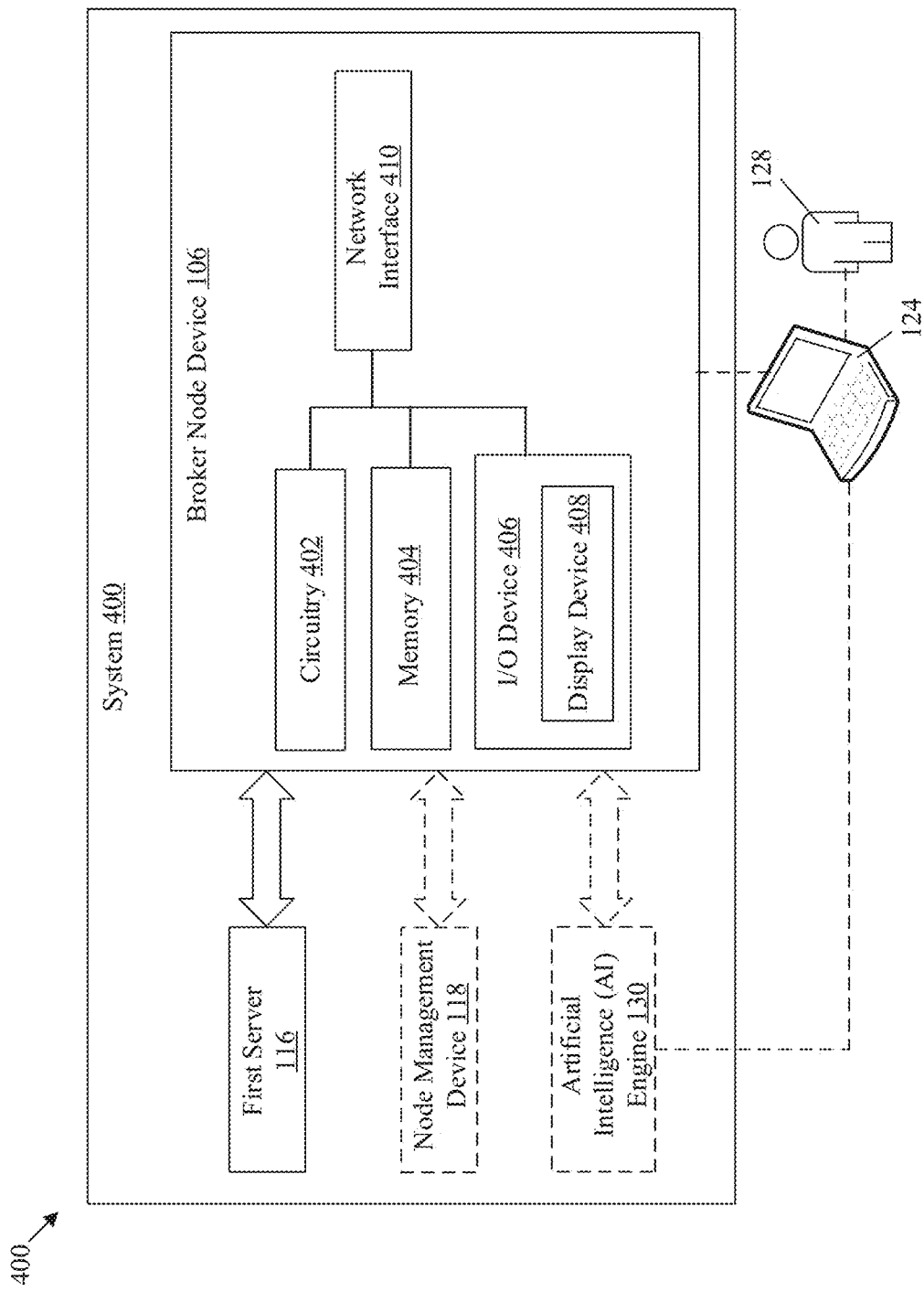
FIG. 4 is a block diagram of a system for user interface-based mobility transaction on a MaaS network, in accordance with an embodiment of the disclosure.

FIG. 4 is a block diagram of a system for user interface-based mobility transaction management on a MaaS network, in accordance with an embodiment of the disclosure. FIG. 4 is explained in conjunction with elements from FIG. 1, FIG. 2 and FIGS. 3A-3K. With reference to FIG. 4, there is shown a block diagram of a system 400, which is an exemplary implementation of the system 102 of FIG. 1. The system 400 may include the broker node device 106, and the first server 116. In some embodiments, the system 400 may also include the node management device 118. The first server 116 and the node management device 118 may be communicatively coupled to the broker node device 106. In FIG. 4, there is also shown the IT system 124 associated with the IT administrator 128. The IT system 124 may be communicatively coupled to the broker node device 106. In an embodiment, the system 400 may further include the AI engine 130. The AI engine 130 may be communicatively coupled to the broker node device 106 and the IT system 124.

The broker node device 106 may include circuitry 402, a memory 404, an input/output (I/O) device 406, a display device 408, and a network interface 410. The circuitry 402 may be configured to communicate with the first server 116, the node management device 118, and the IT system 124 by use of the network interface 410. The circuitry 402 may include suitable logic, circuitry, interfaces, and/or code that may be configured to execute instructions for operations to be executed by the broker node device 106. Examples of implementation of the circuitry 402 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 404 may include suitable logic, circuitry, code, and/or interfaces that may be configured to store the instructions executable by the circuitry 402. The memory 404 may also store the operation information of the first plurality of nodes of the first MaaS network, the information related to the determined operational trouble of the one or more nodes of the first plurality of nodes, and information related to the root cause of the failure of transactions associated with one or more transaction messages. Examples of implementation of the memory 404 may include, but are not limited to, Random Access Memory (RAM), Read Only Memory (ROM), Hard Disk Drive (HDD), and/or a Secure Digital (SD) card.

The I/O device 406 may include suitable logic, circuitry, and/or interfaces that may be configured to receive an input and provide an output based on the received input. The received input may correspond to inputs received from the user (or the IT administrator 128) as described, for example, FIGS. 3A-3K. The I/O device 406 may include various input and output devices, which may be configured to communicate with the circuitry 402. Examples of the I/O device 406 may include, but are not limited to, a touch screen, a keyboard, a mouse, a joystick, a display device (e.g., the display device 408), a microphone, or a speaker.

The display device 408 may include suitable logic, circuitry, and interfaces that may be configured to display output associated with the first publisher node 104A. The display device 408 may be controlled by the circuitry 402 to display the UIs described, for example, in FIGS. 3A-3K. The display device 408 may be a touch screen which may enable a user to provide a user-input via the display device 408. The display device 408 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 708 may refer to a display screen of a head mounted device (HMD), a smart-glass device, a see-through display, a projection-based display, an electro-chromic display, or a transparent display.

The network interface 410 may include suitable logic, circuitry, interfaces, and/or code that may be configured to enable communication between the broker node device 106, the first server 116, the node management device 118, and the IT system 124, via one or more communication networks (not shown). The network interface 410 may implement known technologies to support wired or wireless communication with the one or more communication networks.

The network interface 410 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 410 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

Similar to the broker node device 106, each of the first server 116, the node management device 118, the IT system 124, and the AI engine 130 may include one or more components including circuitry, a memory, a I/O device, a display device, and a network interface, with similar functions. The functions or operations executed by the broker node device 106, as described in FIG. 1, FIG. 2, FIGS. 3A-3K, and FIG. 5, may be performed by the circuitry 402. Operations executed by the circuitry 402 are described in detail, for example, in FIG. 1, FIG. 2, FIGS. 3A-3K, and FIG. 5.

Figure 5:
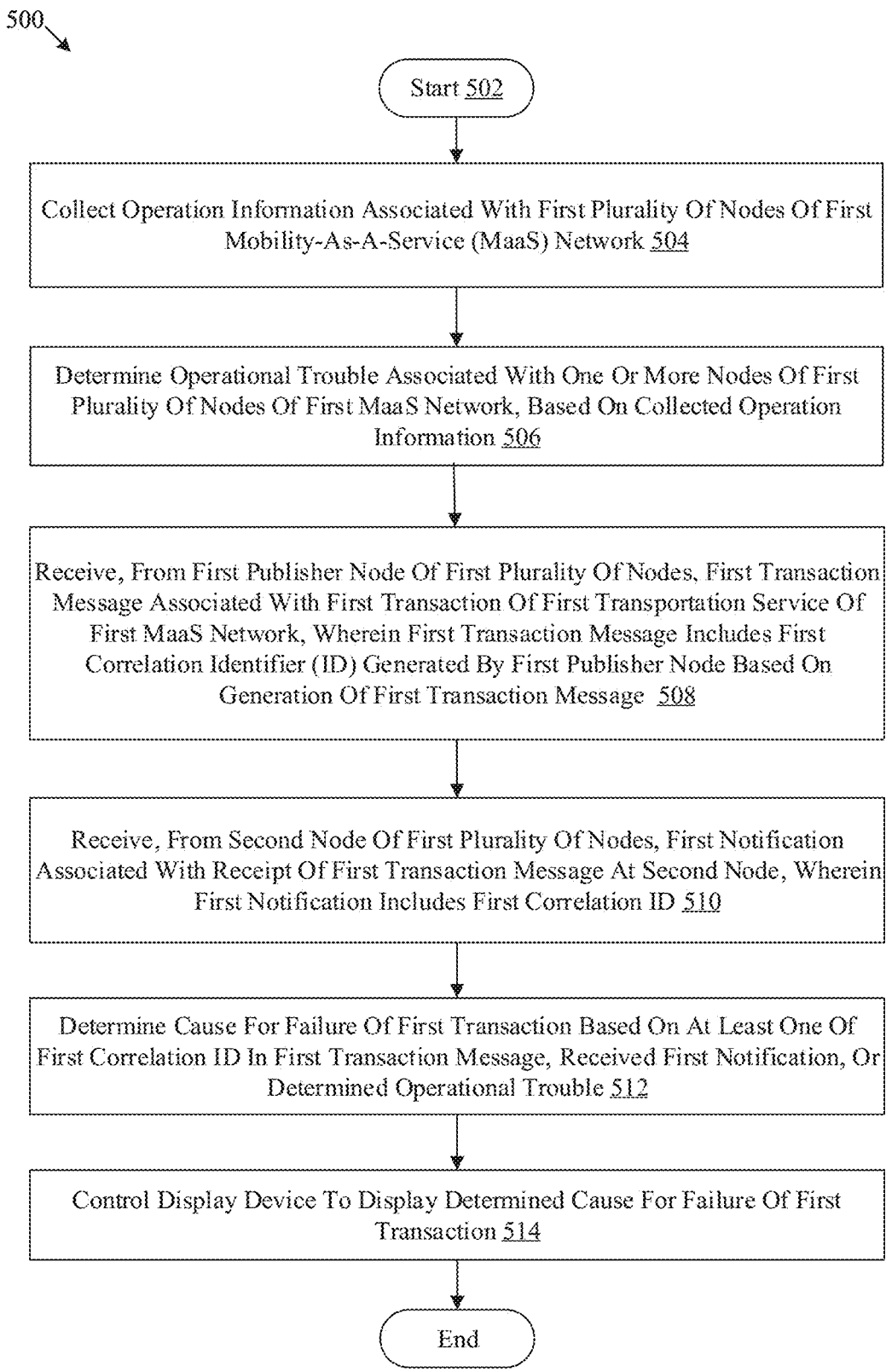
FIG. 5 is a flowchart that illustrates an exemplary method for user interface-based mobility transaction on a MaaS network, in accordance with an embodiment of the disclosure.

FIG. 5 is a flowchart that illustrates an exemplary method for user interface-based mobility transaction management on a MaaS network, in accordance with an embodiment of the disclosure. FIG. 5 is described in conjunction with elements from FIGS. 1, 2, 3A-3K, and 4. With reference to FIG. 5, there is shown a flowchart 500. The exemplary method of the flowchart 500 may be executed by any computing system, for example, by the broker node device 106 of FIG. 1. The exemplary method of the flowchart 500 may start at 502 and proceed to 504.

At 504, the operation information associated with the first plurality of nodes of the first MaaS network may be collected. In accordance with an embodiment, the broker node device 106 may be configured to collect the operation information (such as the network connectivity status and the device operational status) associated with the first plurality of nodes (for example, the publisher nodes 104A-104N, the subscriber node 108A-108N, and the broker node device 106) of the first MaaS network. In an embodiment, prior to the collection of the operation information, the broker node device 106 may receive initial master configuration information related to each of the first plurality of nodes of the first MaaS network from the central storage repository 122. The master configuration information may include, but is not limited to, owner profile information (including a mobility provider company and a MaaS company), asset profile information (including a region of deployment and an identifier), and location information (including a name, an address, and geographical information) of each node of the first plurality of nodes. Based on the initial master configuration information, the broker node device 106 may send an instruction to each node of the first plurality of nodes (and the first server 116) to periodically send a heartbeat signal (i.e. indicating a current operation status of the node) to the broker node device 106. Based on the receipt of such periodic heartbeat signals from each node of the plurality of nodes (and the first server 116), the broker node device 106 may collect the operation information of the respective nodes (and the first server 116) from the corresponding heartbeat signal.

At 506, the operational trouble associated with the one or more nodes of the first plurality of nodes of the first MaaS network, may be determined, based on the collected operation information. In accordance with an embodiment, the broker node device 106 may be configured to determine the operational trouble associated with the one or more nodes of the first plurality of nodes of the first MaaS network, based on the collected operation information. Examples of the operational troubles of the one or more nodes may include, but are not limited to, the network connectivity failure, the operational failure, the application error, the overload of message handling capacity, the inability to process ticket transactions due to unavailability of the transport vehicle at the planned trip time or the delayed arrival of the transport vehicle for the pickup or drop in comparison to the planned trip time. The determination of the operational trouble associated with the one or more nodes of the first plurality of nodes of the first MaaS network is described, for example, in FIGS. 3A-3K, and FIG. 2.

At 508, the first transaction message which may be associated with the first transaction of the first transportation service of the first MaaS network may be received, from the first publisher node 104A of the first plurality of nodes of the first MaaS network. In accordance with an embodiment, the broker node device 106 may be configured to receive the first transaction message from the first publisher node 104A. The first transaction message may include the first correlation ID generated by the first publisher node 104A based on the generation of the first transaction message. The receipt of the first transaction message is described, for example, in FIG. 2 and FIG. 3C.

At 510, the first notification associated with the receipt of the first transaction message at the second node, may be received, from the second node of the first plurality of nodes of the first MaaS network. In accordance with an embodiment, the broker node device 106 may be configured to receive the first notification (i.e. associated with the receipt of the first transaction message at the second node) from the second node. In an exemplary embodiment, the second node may be for example, a subscriber node (such as the second subscriber node 108B) or the server node associated with the first server 116. The first notification may include the first correlation ID. The receipt of the first notification associated with the receipt of the first transaction message at the second node is described, for example, in FIGS. 3A-3K and FIG. 2.

At 512, the cause for failure of the first transaction may be determined based on at least one of the first correlation ID in the first transaction message, the received first notification, or the determined operational trouble. In accordance with an embodiment, the broker node device 106 may be configured to determine the cause for failure of the first transaction based on the first correlation ID in the first transaction message, the received first notification, the determined operational trouble, or the combination. Examples of the cause for failure of the first transaction may include, but are not limited to, the operational trouble associated with the broker node device 106, the operational trouble associated with the first server 116, the authentication error associated with the first transaction message, the operational trouble of the first publisher node 104A. The determination of the cause for failure of the first transaction is described, for example, in FIG. 3A-3K.

At 514, the display device may be controlled to display the determined cause for failure of the first transaction. In accordance with an embodiment, the broker node device 106 may be configured to control the display device to display the determined cause for failure of the first transaction. The determined cause for failure of the first transaction may be displayed on the display device through the UI of the IT system 124 or the UI associated with the display device 408 shown in FIG. 4. The determined cause for failure displayed through the UI is explained further, for example, in FIG. 3A-3K. Control may pass to end.

Although the flowchart 500 illustrates discrete operations, such as 504, 506, 508, 510, 512, and 514 the disclosure is not so limited. Accordingly, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory computer readable medium and/or storage medium having stored thereon, instructions executable by a machine and/or a computer (for example the broker node device 106). The instructions may cause the machine and/or computer (for example the broker node device 106) to perform operations that include collection operation information associated with a first plurality of nodes of a first Mobility-as-a-Service (MaaS) network. The operations may further include determination of an operational trouble associated with one or more nodes of the first plurality of nodes of the first MaaS network, based on the collected operation information. The operations may further include reception, from a first publisher node of the first plurality of nodes of the first MaaS network, of a first transaction message which is associated with a first transaction of a first transportation service of the first MaaS network. The first transaction message may include a first correlation identifier (ID) generated by the first publisher node based on a generation of the first transaction message. The operations may further include reception, from a second node of the first plurality of nodes of the first MaaS network, of a first notification associated with a receipt of the first transaction message at the second node, wherein the first notification may include the first correlation ID. The operations may further include determination of a cause for failure of the first transaction based on at least one of the first correlation ID in the first transaction message, the received first notification, or the determined operational trouble. The operations may further include control of a display device to display the determined cause for failure of the first transaction Exemplary aspects of the disclosure may include a system (such as the system 400) that may include a broker node device (such as the broker node device 106). The broker node device 106 may be configured to collect operation information associated with a first plurality of nodes (such as the plurality of publisher nodes 104A-104N, the plurality of subscriber nodes 108A-108N, and the broker node device 106) of a first MaaS network. The broker node device 106 may be further configured to determine an operational trouble associated with one or more nodes of the first plurality of nodes of the first MaaS network, based on the collected operation information. The broker node device 106 may be configured to receive, from a first publisher node (such as the first publisher node 104A) of the first plurality of nodes of the first MaaS network, a first transaction message which is associated with a first transaction of a first transportation service of the first MaaS network. The first transaction message may include a first correlation identifier (ID) that may be generated by the first publisher node 104A based on a generation of the first transaction message. The broker node device 106 may be further configured to receive, from a second node of the first plurality of nodes of the first MaaS network, a first notification associated with a receipt of the first transaction message at the second node. The first notification may include the first correlation ID. Furthermore, the broker node device 106 may be configured to determine a cause for failure of the first transaction based on at least one of the first correlation ID in the first transaction message, the received first notification, or the determined operational trouble. The broker node device 106 may further be configured to control a display device to display the determined cause for failure of the first transaction.

In accordance with an embodiment, the broker node device 106 may be further configured to receive routing information associated with each of the first plurality of nodes of the MaaS network from a central routing configuration repository (such as, the central routing configuration repository 122A). The broker node device 106 may further determine the cause for failure of the first transaction based on the routing information, and the at least one of the first correlation ID in the first transaction message, the received first notification, and the determined operational trouble.

In accordance with an embodiment, the broker node device 106 may be further configured to receive the first transaction message from the first publisher node 104A. The broker node device 106 may further receive, from the first server 116, an authorization to route the first transaction message to a first subscriber node (such as the first subscriber node 108A) of the first plurality of nodes of the first MaaS network, based on the transmitted authorization request. In accordance with an embodiment, the authorization request may include a first device profile and an authentication credential, associated with the first publisher node 104A.

In accordance with an embodiment, the broker node device 106 may be further configured to transmit the first transaction message to the first server 116 along with the first device profile and the authentication credential in the authorization request. The first server 116 may be configured to authenticate the first transaction message as a valid message based on the first device profile and authorize the broker node device 106 further based on the authenticated transaction message.

In accordance with an embodiment, the determined cause for failure of the first transaction comprises at least one of the operational trouble associated with the broker node device 106, an operational trouble associated with a first server (such as the first server 116 associated with the first publisher node 104A and the broker node device 106), an authentication error associated with the first publisher node 104A, an authentication error associated with the first transaction message, an authorization error associated with the broker node device 106 for the first transaction message, the operational trouble associated with the first subscriber node 108A from the plurality of subscriber nodes 108A-108N, the operational trouble of the first publisher node 104A or the operational trouble of the one or more nodes due to an accident of a vehicle associated with the first transportation service or a delay in arrival for a pickup or drop by the vehicle of the first transportation service.

In accordance with an embodiment, the collected operation information includes at least one of a network connectivity status or a device operational status associated with each of the first plurality of nodes of the first MaaS network.

In accordance with an embodiment, the determined operational trouble of the one or more nodes of the first MaaS network comprises, but not limited to, at least one of a network connectivity failure associated with the one or more nodes, an operational failure of the one or more nodes, an application error on the one or more node, an overload of a message handling capacity of the one or more nodes, an inability of the one or more nodes to process ticket transactions due to unavailability of a vehicle at a planned trip time or a delayed arrival of the vehicle for a pickup or drop in comparison to the planned trip time, a natural calamity, a disaster, or a traffic disruption.

In accordance with an embodiment, the broker node device 106 may be further configured to control the display device to display at least one of routing information, the operation information, the operational trouble, identification information of the first publisher node 104A, identification information of the one or more nodes, the first correlation ID, master configuration information associated with the first MaaS network, telemetry information associated with the transactions of the first MaaS network, or transaction statuses associated with one or more routes of the first MaaS network.

In accordance with an embodiment, the broker node device 106 may be further configured to receive, via a user interface (UI) (such as the seventh UI 300G) associated with the display device, an input associated with routing information which is associated with each of the first plurality of nodes of the MaaS network, and further update the routing information based on the received input. The broker node device 106 may further transmit, to a central routing configuration repository (such as the central routing configuration repository 122A), the updated routing information.

In accordance with an embodiment, the broker node device 106 may be further configured to receive, via a user interface (UI) (such as the seventh UI 300G) associated with the display device, an input associated with a selection of a backup node or an alternate node for an operationally troubled first node from the one or more nodes. The broker node device 106 may be further configured to initiate, via a node management device (such as the node management device 118) associated with the broker node device 106, the selection of the backup node or the alternate node for the operationally troubled node based on the received input.

In accordance with an embodiment, the broker node device 106 may be further configured to control the display device to display a notification about the determined cause for failure of the first transaction.

In accordance with an embodiment, the broker node device 106 may be further configured to receive, via a user interface (UI), associated with the display device, an input to view transaction failure information associated with the one or more nodes of the first MaaS network. The broker node device 106 may be further configured to control, the display device, to display the transaction failure information associated with the one or more nodes of the first MaaS network.

In accordance with an embodiment, the broker node device 106 may be further configured to determine the cause for failure for each of a plurality of transactions associated with the one or more nodes of the first MaaS network, and control the display device to display the determined cause for failure for each of the plurality of transactions associated with the one or more nodes.

In accordance with an embodiment, the broker node device 106 may be further configured to determine a recovery time associated with an operationally troubled node of the one or more nodes, based on the determined cause for failure for each of the plurality of transactions associated with the one or more nodes and control the display device to display the recovery time associated with the operationally troubled first node from the one or more nodes.

In an embodiment, the system 400 may further include an Artificial Intelligence (AI) engine (such as, the AI engine 130) associated with the broker node device 106. The AI engine 130 may be configured to determine a recommendation associated with a rectification of the failure of the first transaction. The AI engine 130 may be further configured to control the display device to display the determined recommendation. Further, the AI engine 130 may be configured to determine a predicted future impact on an operation of the first MaaS network based on the determined operational trouble and the determined cause for failure of the first transaction. The AI engine 130 may control the display device to display the determined predicted future impact.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
   a server;
   a broker node device configured to:
      collect operation information associated with a plurality of nodes of a Mobility-as-a-Service (MaaS) network, wherein the collected operation information includes at least one of a network connectivity status or a device operational status associated with each node of the plurality of nodes of the MaaS network;
      determine at least one of:
         a network connectivity failure associated with one or more nodes of the plurality of nodes of the MaaS network,
         an overload of a message handling capacity of the one or more nodes, or
         an operational failure of the one or more nodes,
         wherein the determination is based on the collected operation information;
      receive, from a publisher node of the plurality of nodes of the MaaS network, a transaction message which is associated with a transaction of a transportation service of the MaaS network,
         wherein the transaction message includes a correlation identifier (ID) generated by the publisher node based on a generation of the transaction message;
      transmit, to the server, an authorization request associated with the received transaction message, wherein
         the server is associated with the broker node device and the publisher node, and
         the server is configured to:
            authenticate the transaction message as a valid message based on the authorization request; and
            authorize, based on the authentication of the transaction message, the broker node device to route the transaction message to a second node of the plurality of nodes;
      receive, from the server, the authorization to route the transaction message to the second node;
      receive, from the second node, a notification associated with a receipt of the transaction message at the second node, wherein the notification includes the correlation ID;
      determine at least one node of the one or mode nodes as a cause for failure of the transaction associated with the one or more nodes, wherein
         the cause for failure of the transaction comprises at least an error associated with the authorization of the broker node device, and
         the determination of the at least one node as the cause of the failure is based on at least one of the correlation ID in the transaction message, the received notification, or the determined at least one of the network connectivity failure, the overload of the message handling capacity, or the operational failure of the one or more nodes;
      determine a recovery time associated with the at least one node of the one or more nodes, based on the cause for failure of the transaction associated with the one or more nodes; and
      control a display device to display information of the cause of the failure and the recovery time associated with the at least one node; and
   an Artificial Intelligence (AI) engine associated with the broker node device, wherein the AI engine is configured to:
      determine a predicted future impact of an operational trouble on an operation of the MaaS network, wherein
         the predicted future impact is determined, based on time series information related to the device operational status or the operational failure of the one or more nodes associated with the MaaS network, for classification of the operation trouble;
      determine a recommendation associated with rectification of at least one of the failure of the transaction or the operational trouble; and control the display device to display the determined recommendation.

2. The system according to claim 1, wherein the broker node device is further configured to:
receive routing information associated with each node of the plurality of nodes of the MaaS network from a central routing configuration repository; and
determine the cause for failure of the transaction based on the routing information, and the at least one of the correlation ID in the transaction message, the received notification, and the determined at least one of the network connectivity failure, the overload of the message handling capacity, or the operational failure of the one or more nodes.

3. The system according to claim 1, wherein the authorization request comprises a device profile and an authentication credential, associated with the publisher node.

4. The system according to claim 3, wherein
the broker node device is further configured to transmit the transaction message to the server along with the device profile and the authentication credential in the authorization request, and
the server is further configured to authenticate the transaction message as the valid message based on the device profile.

5. The system according to claim 1, wherein the cause for failure of the transaction further comprises at least one of:
an operational trouble associated with the broker node device,
an operational trouble associated with the server, wherein the server is associated with the publisher node and the broker node device,
an authentication error associated with the publisher node,
an authentication error associated with the transaction message,
an operational trouble associated with a subscriber node from a plurality of subscriber nodes,
an operational trouble of the publisher node,
an operational trouble of the one or more nodes due to an accident of a vehicle associated with the transportation service or a delay in arrival for a pickup or drop by the vehicle of the transportation service,
a natural calamity,
a disaster, or
a traffic disruption.

6. The system according to claim 1, wherein
the broker node device is further configured to determine the operational trouble of the one or more nodes of the MaaS network, and
the operational trouble comprises:
the at least one of:
the network connectivity failure associated with the one or more nodes,
the operational failure of the one or more nodes, or
the overload of the message handling capacity of the one or more nodes, and
at least one of an application error on the one or more nodes or an inability of the one or more nodes to process ticket transactions due to unavailability of a vehicle at a planned trip time or a delayed arrival of the vehicle for a pickup or drop in comparison to the planned trip time.

7. The system according to claim 1, wherein the broker node device is further configured to control the display device to display at least one of routing information, the operation information, identification information of the publisher node, identification information of the one or more nodes, the correlation ID, master configuration information associated with the MaaS network, telemetry information associated with transactions of the MaaS network, or transaction statuses associated with one or more routes of the MaaS network.

8. The system according to claim 1, wherein the broker node device is further configured to:
receive, via a user interface (UI) associated with the display device, an input associated with routing information which is further associated with each node of the plurality of nodes of the MaaS network;
update the routing information based on the received input; and
transmit, to a central routing configuration repository, the updated routing information.

9. The system according to claim 1, wherein the broker node device is further configured to:
receive, via a user interface (UI) associated with the display device, an input associated with a selection of a backup node or an alternate node for an operationally troubled node from the one or more nodes; and
initiate, via a node management device associated with the broker node device, the selection of the backup node or the alternate node for the operationally troubled node based on the received input.

10. The system according to claim 1, wherein the broker node device is further configured to control the display device to display a notification about the cause for failure of the transaction.

11. The system according to claim 1, wherein the broker node device is further configured to:
receive, via a user interface (UI) associated with the display device, an input to view transaction failure information associated with the one or more nodes of the MaaS network; and
control, the display device, to display the transaction failure information associated with the one or more nodes of the MaaS network.

12. The system according to claim 1, wherein the broker node device is further configured to:
determine the cause for failure for each of a plurality of transactions associated with the one or more nodes of the MaaS network; and
control the display device to display the determined cause for failure for each of the plurality of transactions associated with the one or more nodes.

13. The system according to claim 12, wherein the broker node device is further configured to determine the recovery time associated with the at least one node of the one or more nodes, based on the determined cause for failure for each of the plurality of transactions associated with the one or more nodes.

14. The system according to claim 1, wherein the AI engine is further configured to:
determine the predicted future impact based on the cause for failure of the transaction and the determined at least one of the network connectivity failure, the overload of the message handling capacity, or the operational failure; and
control the display device to display the determined predicted future impact.

15. A method, comprising:
in a system including a server and a broker node device:
collecting, by the broker node device, operation information associated with a plurality of nodes of a Mobility-as-a-Service (MaaS) network, wherein the collected operation information includes at least one of a network connectivity status or a device operational status associated with each node of the plurality of nodes of the MaaS network;
determining, by the broker node device, at least of:
a network connectivity failure associated with one or more nodes of the plurality of nodes of the MaaS network,
an overload of a message handling capacity of the one or more nodes, or
an operational failure of the one or more nodes,
wherein the determination is based on the collected operation information;
receiving, by the broker node device from a publisher node of the plurality of nodes of the MaaS network, a transaction message which is associated with a transaction of a transportation service of the MaaS network,
wherein the transaction message includes a correlation identifier (ID) generated by the publisher node based on a generation of the transaction message;
transmitting, by the broker node device to the server, an authorization request associated with the received transaction message, wherein the server is associated with the broker node device and the publisher node,
authenticating, by the server, the transaction message as a valid message based on the authorization request; and
authorizing, by the server, the broker node device to route the transaction message to a second node of the plurality of nodes, wherein the authorization is based on the authentication of the transaction message;
receiving, by the broker node device from the server, the authorization to route the transaction message to the second node;
receiving, from the second node, a notification associated with a receipt of the transaction message at the second node, wherein the notification includes the correlation ID;
determining at least one node of the one or mode nodes as a cause for failure of the transaction associated with the one or more nodes, wherein
the cause for failure of the transaction comprises at least an error associated with the authorization of the broker node device, and
the determination of the at least one node as the cause of the failure is based on at least one of the correlation ID in the transaction message, the received notification, or the determined at least one of the network connectivity failure, the overload of the message handling capacity, or the operational failure of the one or more nodes;
determining a recovery time associated with the at least one node of the one or more nodes, based on the cause for failure of the transaction associated with the one or more nodes;
controlling a display device to display information of the cause of the failure and the recovery time associated with the at least one node;
determining, by an Artificial Intelligence (AI) engine associated with the broker node device, a predicted future impact of an operational trouble on an operation of the MaaS network, wherein
the predicted future impact is determined, based on time series information related to the device operational status or the operational failure of the one or more nodes associated with the MaaS network, for classification of the operation trouble;
determining, by the AI engine, a recommendation associated with rectification of at least one of the failure of the transaction or the operational trouble; and
controlling, by the AI engine, the display device to display the determined recommendation.

16. The method according to claim 15, further comprising:
receiving, via a user interface (UI) associated with the display device, an input associated with routing information which is further associated with each of the plurality of nodes of the MaaS network;
updating the routing information based on the received input; and
transmitting, to a central routing configuration repository, the updated routing information.

17. A non-transitory computer-readable medium having stored thereon, computer-executable instructions that when executed by a system including a broker node device and a server, causes the system to execute operations, the operations comprising:
collecting, by the broker node device, operation information associated with a plurality of nodes of a Mobility-as-a-Service (MaaS) network, wherein the collected operation information includes at least one of a network connectivity status or a device operational status associated with each node of the plurality of nodes of the MaaS network;
determining, by the broker node device, at least of:
a network connectivity failure associated with one or more nodes of the plurality of nodes of the MaaS network,
an overload of a message handling capacity of the one or more nodes, or
an operational failure of the one or more nodes,
wherein the determination is based on the collected operation information,
receiving, by the broker node device from a publisher node of the plurality of nodes of the MaaS network, a transaction message which is associated with a transaction of a transportation service of the MaaS network,
wherein the transaction message includes a correlation identifier (ID) generated by the publisher node based on a generation of the transaction message;
transmitting, by the broker node device to the server, an authorization request associated with the received transaction message, wherein the server is associated with the broker node device and the publisher node,
authenticating, by the server, the transaction message as a valid message based on the authorization request; and
authorizing, by the server, the broker node device to route the transaction message to a second node of the plurality of nodes, wherein the authorization is based on the authentication of the transaction message;
receiving, by the broker node device from the server, the authorization to route the transaction message to the second node;
receiving, from the second node, a notification associated with a receipt of the transaction message at the second node, wherein the notification includes the correlation ID;
determining at least one node of the one or mode nodes as a cause for failure of the transaction associated with the one or more nodes, wherein the cause for failure of the transaction comprises at least an error associated with the authorization of the broker node device, and the determination of the at least one node as the cause of the failure is based on at least one of the correlation ID in the transaction message, the received notification, or the determined at least one of the network connectivity failure, the overload of the message handling capacity, or the operational failure of the one or more nodes;

determining a recovery time associated with the at least one node of the one or more nodes, based on the cause for failure of the transaction associated with the one or more nodes;

controlling a display device to display information of the cause of the failure and the recovery time associated with the at least one node;

determining, by an Artificial Intelligence (AI) engine associated with the broker node device, a predicted future impact of an operational trouble on an operation of the MaaS network, wherein the predicted future impact is determined, based on time series information related to the device operational status or the operational failure of the one or more nodes associated with the MaaS network, for classification of the operation trouble;

determining, by the AI engine, a recommendation associated with rectification of at least one of the failure of the transaction or the operational trouble; and controlling, by the AI engine, the display device to display the determined recommendation.

\* \* \* \* \*